(12) United States Patent
Inoue

(10) Patent No.: US 8,749,742 B2
(45) Date of Patent: Jun. 10, 2014

(54) DISPLAY DEVICE AND LIQUID CRYSTAL ELEMENT

(75) Inventor: Yuichi Inoue, Kanagawa (JP)

(73) Assignee: Sony Corporation, Tokyo (JP)

(*) Notice: Subject to any disclaimer, the term of this patent is extended or adjusted under 35 U.S.C. 154(b) by 3 days.

(21) Appl. No.: 13/362,710

(22) Filed: Jan. 31, 2012

(65) Prior Publication Data

US 2012/0200806 A1 Aug. 9, 2012

(30) Foreign Application Priority Data

Feb. 8, 2011 (JP) ................................. 2011-025324

(51) Int. Cl.
G02F 1/1337 (2006.01)
G02F 1/1335 (2006.01)

(52) U.S. Cl.
USPC ............................................ 349/129; 349/15

(58) Field of Classification Search
USPC ............................................................ 349/15
See application file for complete search history.

(56) References Cited

U.S. PATENT DOCUMENTS

| | | | | |
|---|---|---|---|---|
| 2002/0159018 | A1* | 10/2002 | Kataoka et al. | 349/143 |
| 2011/0001894 | A1* | 1/2011 | Owaku et al. | 349/15 |
| 2011/0050683 | A1 | 3/2011 | Yun et al. | |
| 2012/0019733 | A1* | 1/2012 | Kim et al. | 349/15 |

FOREIGN PATENT DOCUMENTS

| | | |
|---|---|---|
| EP | 1515178 A1 | 3/2005 |
| JP | 2002-107730 A | 4/2002 |
| JP | 2005-086506 A | 3/2005 |
| JP | 2009-151204 A | 7/2009 |

* cited by examiner

*Primary Examiner* — Wen-Ying P Chen
(74) *Attorney, Agent, or Firm* — Wolf, Greenfield & Sacks, P.C.

(57) ABSTRACT

A display device includes a display section displaying images, and a liquid crystal barrier section having liquid crystal barriers formed to extend in a first direction tilted from a vertical direction in a display plane, the liquid crystal barriers allowing light to pass therethrough or to be blocked. The liquid crystal barrier section includes a liquid crystal layer, and a first electrode and a second electrode which are disposed at positions corresponding to each of the liquid crystal barriers to sandwich the liquid crystal layer. The first electrode includes a first stem extending in the first direction, and branches extending on both sides of the first stem, branches on one side of the first stem extending in a first extending direction, whereas branches on the other side of the first stem extending in a second extending direction, the first and second extending directions being line-asymmetrical about the first stem.

7 Claims, 22 Drawing Sheets

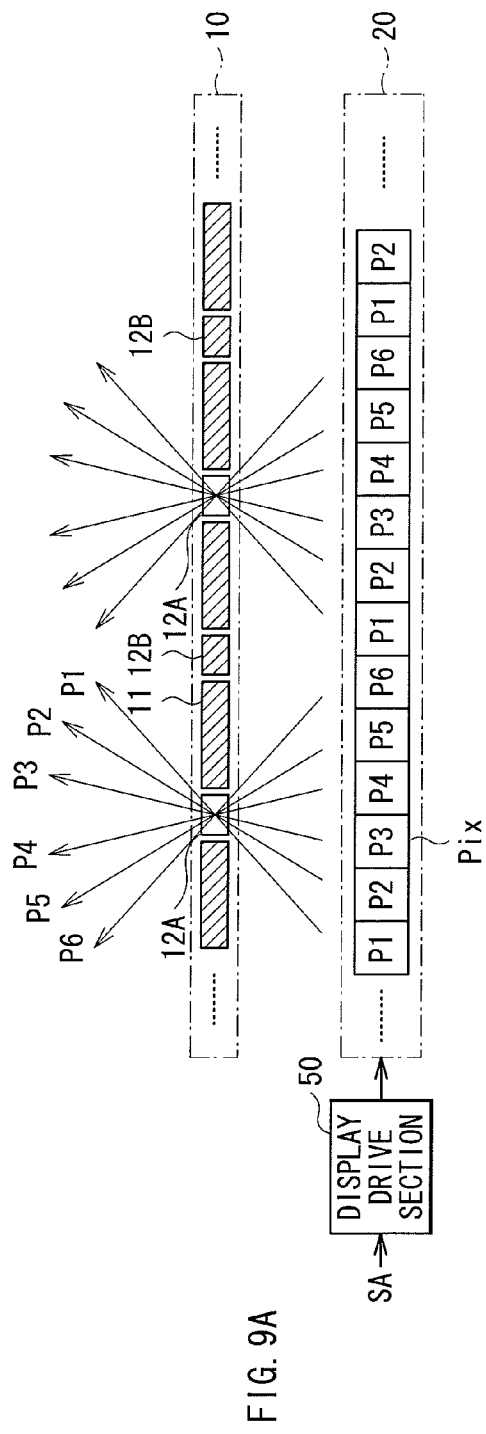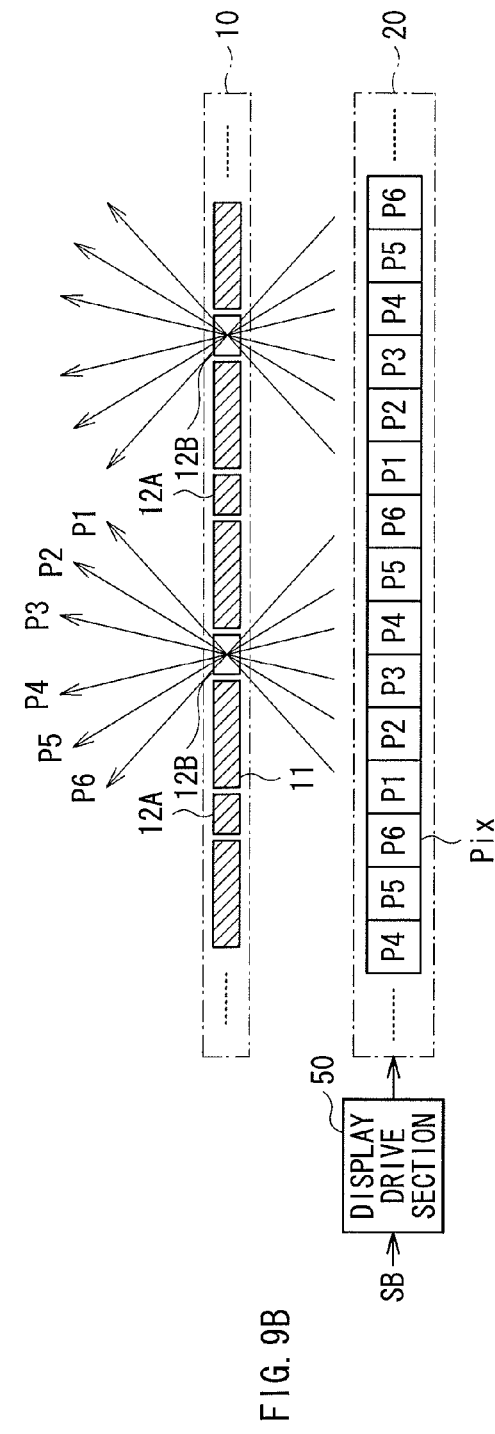

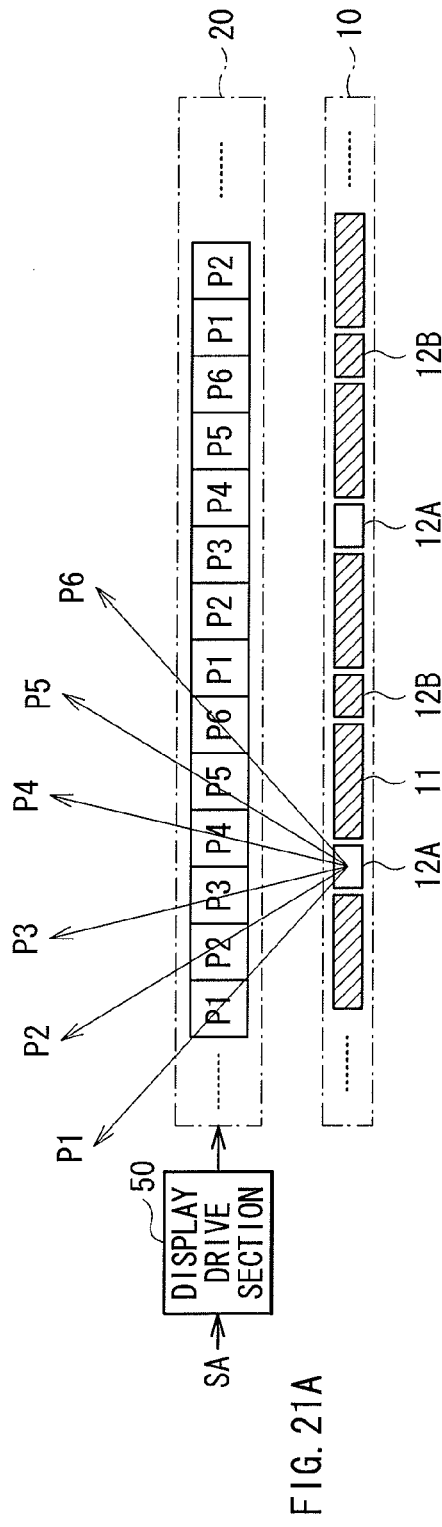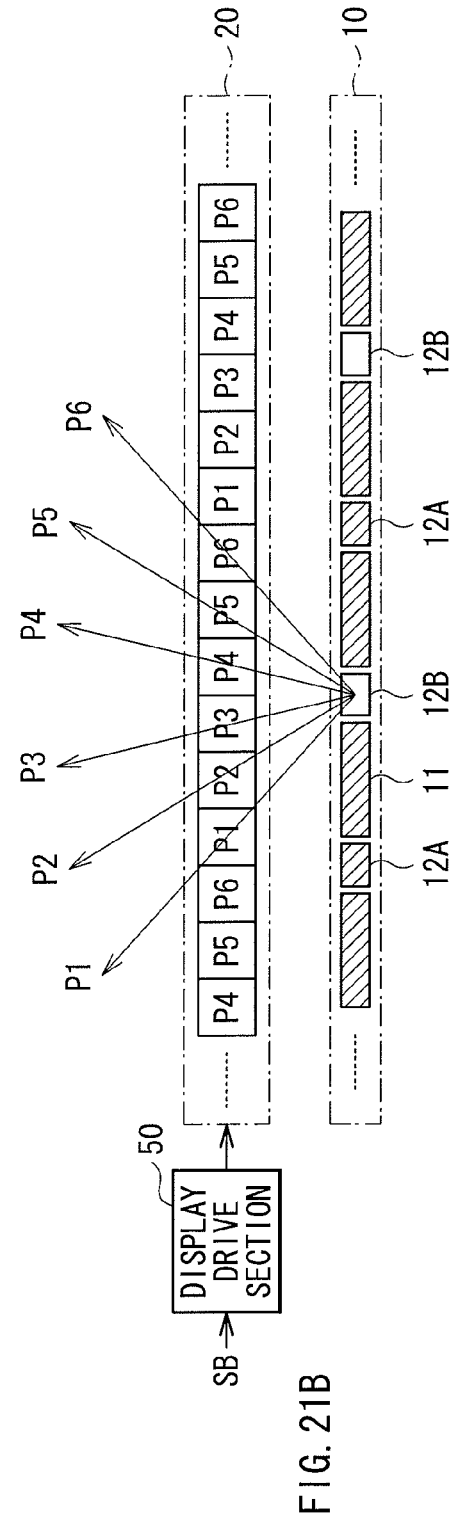
FIG. 21A
FIG. 21B

DISPLAY DEVICE AND LIQUID CRYSTAL ELEMENT

BACKGROUND

This disclosure relates to a display device capable of achieving stereoscopic display by a parallax barrier system, and a liquid crystal element used in such a display device.

Recently, attention has been focused on a display device capable of achieving stereoscopic display. In stereoscopic display, a left-eye image and a right-eye image with parallax therebetween (with different eyepoints) are displayed, and when a viewer views the respective images with two eyes, the viewer may perceive a deep stereoscopic image. In addition, a display device has been developed, which displays three or more images with parallax thereamong, making it possible to provide a more natural stereoscopic image to a viewer.

Such display devices are roughly classified into two types: one using special glasses and the other using no special glasses. Since the special glasses are often unpleasant for a viewer, the type using no special glasses has been generally desired. A display device requiring no special glasses includes, for example, a lenticular lens type and a parallax barrier type. In such types, a plurality of images (perspective images) with parallax therebetween is displayed at a time, and a viewer views different images depending on a relative positional relationship (angle) between the display device and the eyepoint of the viewer. For example, in Japanese Unexamined Patent Application Publication No. 2005-86506, a parallax barrier type display device in which liquid crystal barriers are configured to extend in an oblique direction of a display screen in order to suppress occurrence of crosstalk and moire is proposed.

Incidentally, in a display device displaying two-dimensional images, a wide viewing angle is generally desired. For example, in Japanese Unexamined Patent Application Publication Nos. 2009-151204 and 2002-107730, a so-called multi-domain type display device is proposed as a liquid crystal display device. In the multi-domain type display device, a pixel electrode configured of stems and branches is divided into a plurality of regions, and the branches are configured to extend in different directions between regions, so that the viewing angle is symmetrical in a lateral direction and in a longitudinal direction to achieve a wide viewing angle.

SUMMARY

Incidentally, a wide viewing angle is also desired in a display device capable of displaying stereoscopic images. However, in Japanese Unexamined Patent Application Publication No. 2005-86506, a method of achieving a wide viewing angle is not described at all.

It is desirable to provide a display device and a liquid crystal element which are capable of achieving stereoscopic display with a wide viewing angle.

A display device according to an embodiment of the technology includes a display section and a liquid crystal barrier section. The display section displays images. The liquid crystal barrier section includes a plurality of liquid crystal barriers formed to extend in a first direction tilted from a vertical direction in a display plane of the display section, and the liquid crystal barriers allows light to pass therethrough or to be blocked. The liquid crystal barrier section includes a liquid crystal layer, and a first electrode and a second electrode which are disposed at positions corresponding to each of the liquid crystal barriers to sandwich the liquid crystal layer. The first electrode includes a first stem extending in the first direction, and a plurality of branches extending on both sides of the first stem, branches on one side of the first stem extending in a first extending direction, whereas branches on the other side of the first stem extending in a second extending direction, the first and second extending directions being line-asymmetrical about the first stem.

A liquid crystal element according to an embodiment of the technology includes a liquid crystal layer, and a first electrode and a second electrode. The liquid crystal layer is arranged apart from a display plane of a display section which displays images. The first electrode and the second electrode are configured to sandwich the liquid crystal layer. The first electrode includes a first stem extending in a first direction tilted from a vertical direction in the display plane of the display section, and a plurality of branches extending on both sides of the first stem, branches on one side of the first stem extending in a first extending direction, whereas branches on the other side of the first stem extending in a second extending direction, the first and second extending directions being line-asymmetrical about the first stem.

In the display device and the liquid crystal element according to the embodiments of the technology, a plurality of open/close sections extending in the first direction tilted from the vertical direction in the display plane is opened or closed so that a plurality of different perspective images displayed on the display section is displayed to be viewed as a stereoscopic image. At this time, liquid crystal molecules in the liquid crystal layer configuring the open/close sections are controlled to be aligned in the respective extending directions of the branches which extend in directions asymmetrical about a stem on both sides of the stem extending in the first direction.

In the display device according to the embodiment of the technology, for example, the first and second extending directions are preferably line-symmetrical about a line extending in the vertical direction Moreover, for example, a plurality of sub-electrode regions may be provided along the first direction, and the plurality of branches may be provided for each of the plurality of sub-electrode regions. In addition, for example, the first electrode may include, for each of the plurality of sub-electrode regions, a second stem extending in a second direction intersecting the first stem, each of the plurality of sub-electrode regions may be partitioned into first to fourth branch regions, the first and second branch regions being arranged on one side of the first stem to sandwich the second stem, the third branch region being arranged on an opposite side of the first stem from the first branch region, the fourth branch region being arranged on an opposite side of the first stem from the second branch region, and branches included in each of the first to fourth branch regions desirably extend in the same direction within respective branch regions. In this case, for example, the branches in each of the first to fourth branch regions desirably extend in a direction away from both the first stem and the second stem. Moreover, for example, an extending direction of the branches in the first branch region may be the same as an extending direction of the branches in the fourth branch region, and an extending direction of the branches in the second branch region may be the same as an extending direction of the branches in the third branch region.

In this case, for example, the second direction corresponds to the horizontal direction in the display plane of the display section, and in each of the sub-electrode regions, the extending direction of the branches in the first branch region and the extending direction of the branches in the second branch region may be line-symmetrical about the second stem, and the extending direction of the branches in the third branch region and the extending direction of the branches in the fourth branch region may be line-symmetrical about the second stem. Moreover, for example, the second direction corresponds to a direction tilted from the horizontal direction in the display screen of the display section, and in each of the sub-electrode regions, the extending direction of the branches in the first branch region and the extending direction of the branches in the second branch region may be line-asymmetrical about the second stem, and the extending direction of the branches in the third branch region and the extending direction of the branches in the fourth branch region may be line-asymmetrical about the second stem.

Moreover, for example, the display device according to the embodiment of the technology further includes a first polarizing plate disposed on an opposite side of the first electrode from the liquid crystal layer and allowing light polarized in one direction of the vertical direction and the horizontal direction in the display plane of the display section, to pass therethrough, and a second polarizing plate disposed on an opposite side of the second electrode from the liquid crystal layer and allowing light polarized in the other direction of the vertical direction and the horizontal direction, to pass therethrough. The branches in the first branch region and the branches in the fourth branch region may extend in a direction tilted counterclockwise from the horizontal direction by 45 degrees, and the branches in the second branch region and the branches in the third branch region may extend in a direction tilted clockwise from the horizontal direction by 45 degrees.

Furthermore, for example, the plurality of branches may be partitioned into branches in a first branch region and branches in a second branch region, the first and second branch regions being located on both sides of the first stem, branches included in each of first and branch regions may extend in the same direction within respective branch regions, and branches in the first branch region may extend in a direction different from a extending direction of branches in the second branch region. In addition, for example, the display device according to the embodiment of the technology further includes a first polarizing plate provided on an opposite side of the first electrode from the liquid crystal layer, and allowing light polarized in one direction of the vertical direction and a horizontal direction in the display plane of the display section, to pass therethrough, and a second polarizing plate provided on an opposite side of the second electrode from the liquid crystal layer and allowing light polarized in the other direction of the vertical direction and the horizontal direction in the display plane of the display section, to pass therethrough. The branches in the first branch region may extend in a direction tilted counterclockwise from the horizontal direction by 45 degrees. The branches in the second branch region may extend in a direction tilted clockwise from the horizontal direction by 45 degrees.

Moreover, for example, the display device according to the embodiment of the technology further includes a plurality of display modes including a three-dimensional display mode and a two-dimensional display mode. The plurality of liquid crystal barriers includes a plurality of first liquid crystal barriers and a plurality of second liquid crystal barriers. The three-dimensional display mode may allow the display section to display a plurality of different perspective images, allow the plurality of first liquid crystal barriers to stay in a transmissive state as well as the plurality of second liquid crystal barriers to stay in a blocking state, and thus allow a three-dimensional image to be displayed. The two-dimensional display mode may allow the display section to display one perspective image, allow the plurality of first liquid crystal barriers and the plurality of second liquid crystal barriers to stay in the transmissive state, and thus allow a two-dimensional image to be displayed. In this case, for example, the plurality of first liquid crystal barriers may be grouped into a plurality of barrier groups, and the three-dimensional display mode may allow the liquid crystal barriers in each of the plurality of barrier group to be time-divisionally switched between the transmissive state and the blocking state.

Furthermore, for example, the display device according to the embodiment of the technology may further include a backlight. The display section may be a liquid crystal display section which is disposed between the backlight and the liquid crystal barrier section. Moreover, for example, the display device according to the embodiment of the technology may further include a backlight. The display section may be a liquid crystal display section which is disposed between the backlight and the liquid crystal display section.

In the display device and the liquid crystal element according to the embodiments of the technology, the extending directions of the branches on both sides of the first stem are asymmetrical about the first stem extending in the first direction so that a wide viewing angle is allowed to be achieved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 9A and 9B are other schematic views illustrating operation examples of the display section and the liquid crystal barrier illustrated in FIG. 1.

FIGS. 21A and 21B are schematic views illustrating operation examples of the stereoscopic display device according to the modification.

DETAILED DESCRIPTION

Hereinafter, preferred embodiments of the technology will be described in detail with reference to drawings. Note that description will be given in the following order.
1. First embodiment
2. Second embodiment
[1. First Embodiment]

CONFIGURATION EXAMPLE

General Configuration Example

Figure 1:
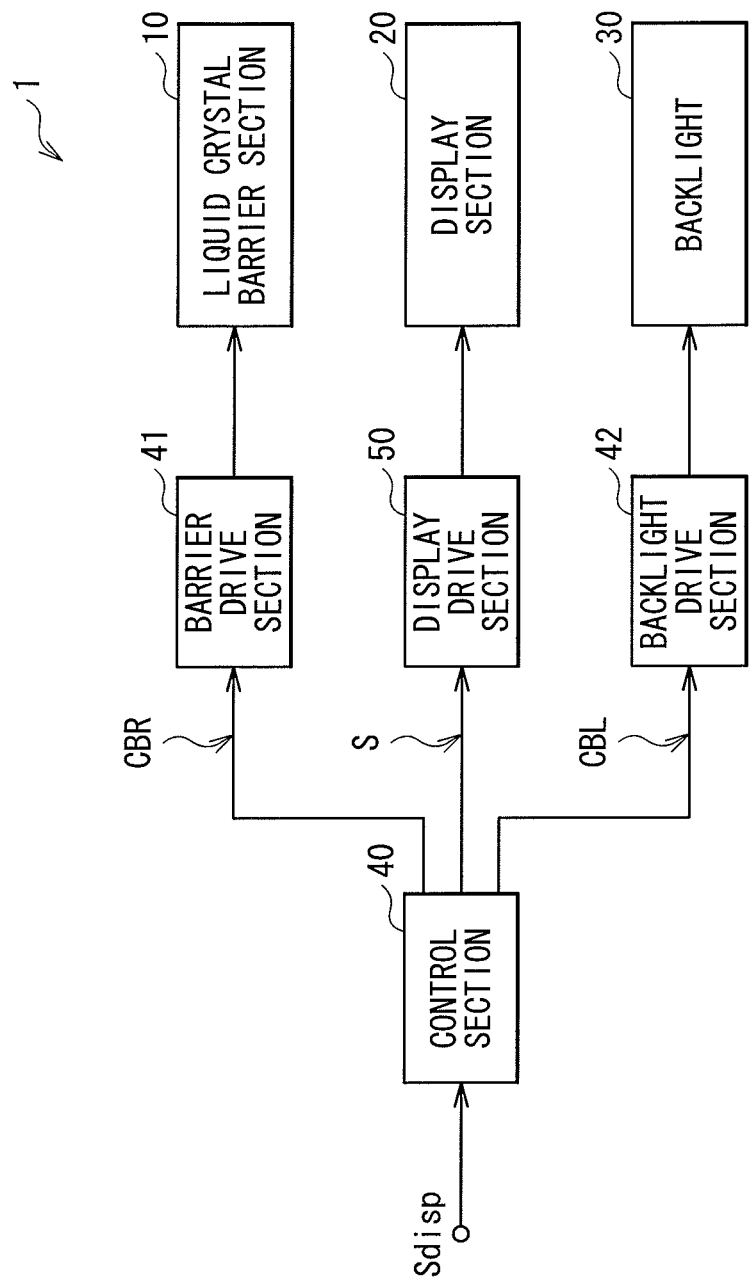
FIG. 1 is a block diagram illustrating a configuration example of a stereoscopic display device according to a first embodiment of the technology.

FIG. 1 illustrates a configuration example of a stereoscopic display device according to a first embodiment of the technology. Note that since a liquid crystal element according to an embodiment of the technology is embodied by the embodiment, the liquid crystal element is described together with the stereoscopic display device. The stereoscopic display device 1 includes a control section 40, a display drive section 50, a display section 20, a backlight drive section 42, a backlight 30, a barrier drive section 41, and a liquid crystal barrier section 10.

The control section 40 is a circuit which supplies each of the display drive section 50, the backlight drive section 42, and the barrier drive section 41 with a control signal based on an image signal Sdisp supplied from the outside, and controls these sections to operate in synchronization with one another. Specifically, the control section 40 supplies the display drive section 50 with an image signal S based on the image signal Sdisp, supplies the backlight drive section 42 with a backlight control signal CBL, and supplies the barrier drive section 41 with a barrier control signal CBR. Herein, in the case where the stereoscopic display device 1 performs stereoscopic display, the image signal S is configured of image signals SA and SB each including a plurality of (six in this case) perspective images as will be described later.

The display drive section 50 drives the display section 20 based on the image signal S supplied from the control section 40. The display section 20 is a liquid crystal display section in this example, and performs display by driving liquid crystal display elements and modulating light emitted from the backlight 30.

The backlight drive section 42 drives the backlight 30 based on the backlight control signal CBL supplied from the control section 40. The backlight 30 has a function to emit surface-emitted light with respect to the display section 20. The backlight 30 is configured with use of, for example, an LED (Light Emitting Diode) or a CCFL (Cold Cathode Fluorescent Lamp).

The barrier drive section 41 drives the liquid crystal barrier section 10 based on the barrier control signal CBR supplied from the control section 40. The liquid crystal barrier section 10 allows light which has been emitted from the backlight 30 and then passed through the display section 20 to pass therethrough (open operation) or to be blocked (close operation). The liquid crystal barrier section 10 includes a plurality of open/close sections 11 and 12 (described later) each configured with use of a liquid crystal.

Figure 2A:
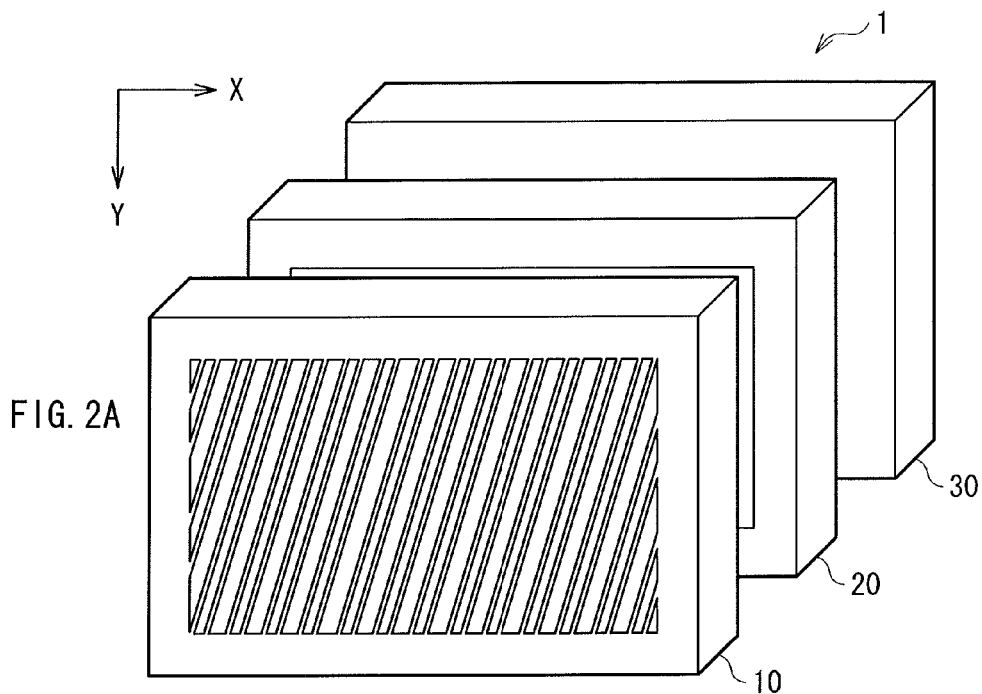
FIGS. 2A and 2B are explanatory diagrams illustrating a configuration example of the stereoscopic display device illustrated in FIG. 1.
Figure 2B:
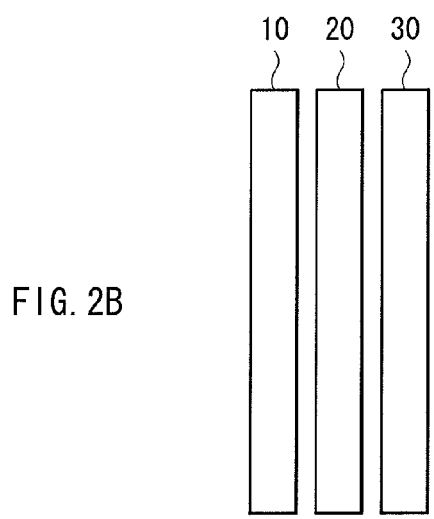

FIGS. 2A and 2B illustrate a configuration example of a relevant part of the stereoscopic display device 1, where FIGS. 2A and 2B illustrate an exploded perspective configuration and a side view of the stereoscopic display device 1, respectively. As illustrated in FIGS. 2A and 2B, respective components of the stereoscopic display device 1 are arranged in order of the backlight 30, the display section 20, and the liquid crystal barrier section 10. In other words, light emitted from the backlight 30 reaches a viewer through the display section 20 and the liquid crystal barrier section 10.

(Display Drive Section 50 and Display Section 20)

Figure 3:
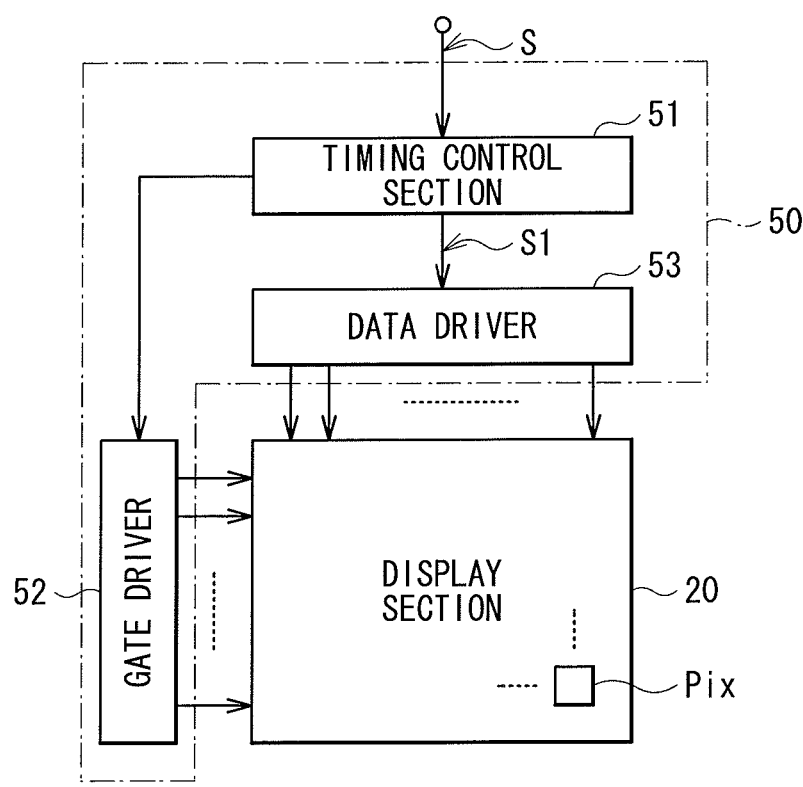
FIG. 3 is a block diagram illustrating a configuration example of a display drive section and a display section illustrated in FIG. 1.

FIG. 3 illustrates an example of a block diagram of the display drive section 50 and the display section 20. The display drive section 50 includes a timing control section 51, a gate driver 52, and a data driver 53. The timing control section 51 controls driving timings of the gate driver 52 and the data driver 53, and supplies the data driver 53 with the image signal S supplied from the control section 40 as the image signal 51. The gate driver 52 sequentially selects pixels Pix in the display section 20 row by row to perform line-sequential scanning according to timing control by the timing control section 51. The data driver 53 supplies each pixel Pix in the display section 20 with a pixel signal based on the image signal 51. Specifically, the data driver 53 performs D/A (digital/analog) conversion based on the image signal 51 to generate a pixel signal as an analog signal, and then supplies the pixel signal to each pixel Pix.

Figure 4A:
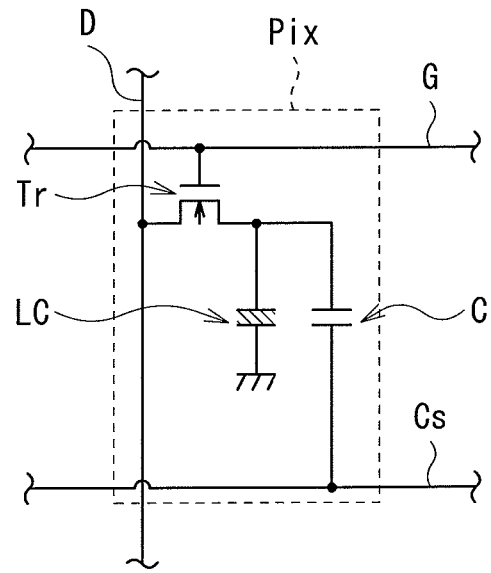
FIGS. 4A and 4B are explanatory diagrams illustrating a configuration example of the display section illustrated in FIG. 1.
Figure 4B:
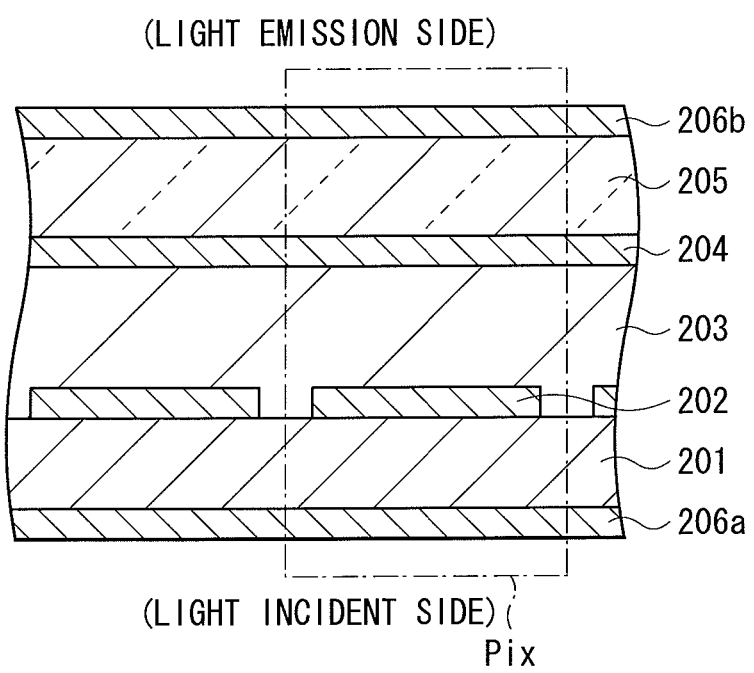

FIGS. 4A and 4B illustrate a configuration example of the display section 20, where FIG. 4A illustrates an example of a circuit diagram of the pixel Pix, and FIG. 4B illustrates a sectional structure of the display section 20.

The pixel Pix includes a TFT (Thin Film Transistor) element Tr, a liquid crystal element LC, and a retention capacitor C as illustrated in FIG. 4A. The TFT element Tr is configured of, for example, a MOS-FET (Metal Oxide Semiconductor-Field Effect Transistor), and has a gate connected to a gate line G, a source connected to a data line D, and a drain connected to one end of the liquid crystal element LC and one end of the retention capacitor C. One end of the liquid crystal element LC is connected to the drain of the TFT element Tr, and the other end is grounded. One end of the retention capacitor C is connected to the drain of the TFT element Tr, and the other end is connected to a retention capacitor line Cs.

The gate line G is connected to the gate driver 52, and the data line D is connected to the data driver 53.

The display section 20 is formed by sealing a liquid crystal layer 203 between a drive substrate 201 and a facing substrate 205 as illustrated in FIG. 4B. The drive substrate 201 is provided with a pixel drive circuit (not illustrated) including the TFT element Tr, and a pixel electrode 202 is disposed for each pixel Pix on the drive substrate 201. The facing substrate 205 has color filters or black matrix (both not illustrated), and a facing electrode 204 is disposed as a common electrode for pixels Pix on a surface facing the liquid crystal layer 203 of the facing substrate 205. On the light incident side (herein, on the backlight 30 side) and the light emission side (herein, on the liquid crystal barrier section 10 side) of the display section 20, polarizing plates 206a and 206b are bonded, respectively, in a crossed-nicols or a parallel-nicol.

(Liquid Crystal Barrier Section 10)

Figure 5A:
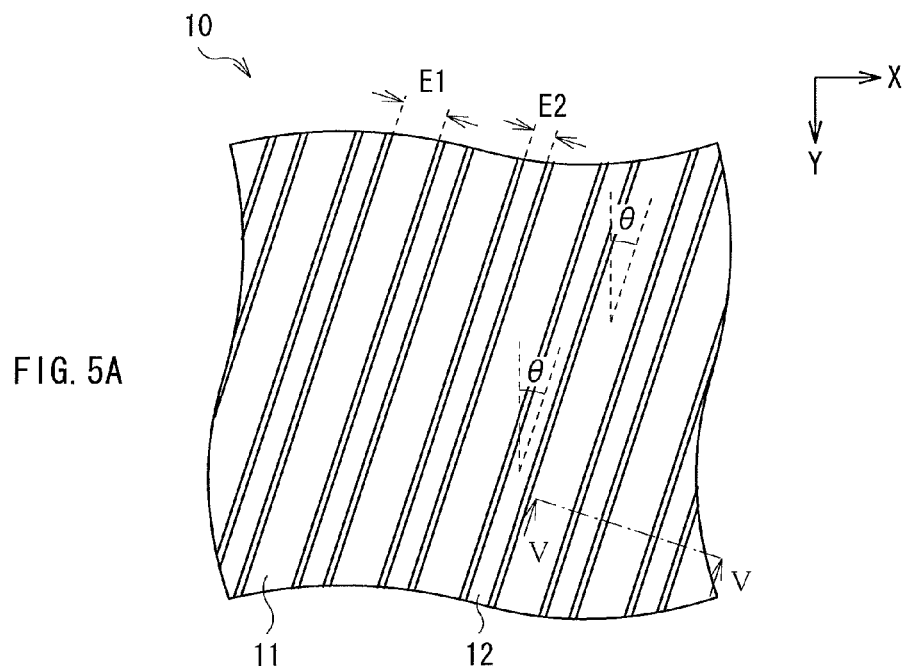
FIGS. 5A and 5B are explanatory diagrams illustrating a configuration example of a liquid crystal barrier illustrated in FIG. 1.
Figure 5B:
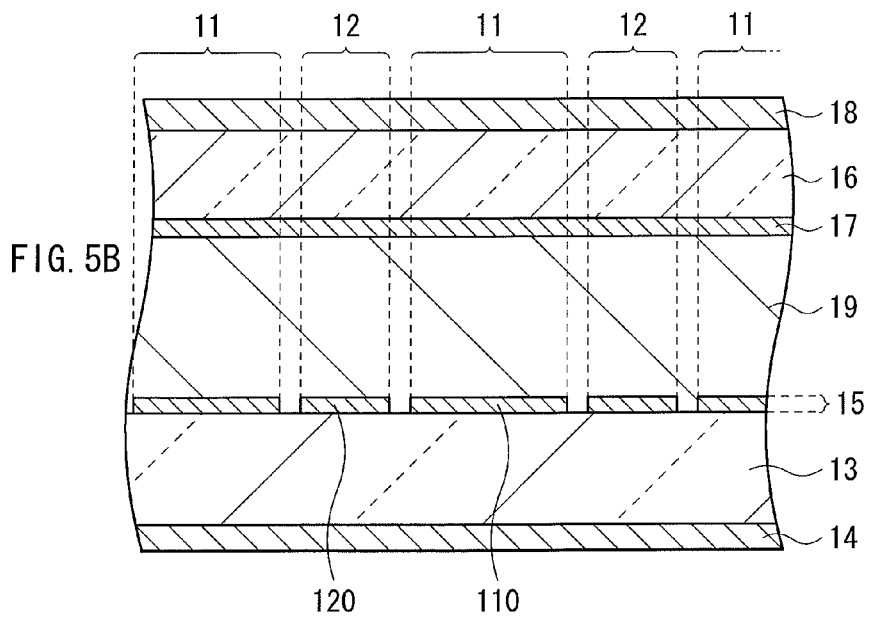

FIGS. 5A and 5B illustrate a configuration example of the liquid crystal barrier section 10, where FIG. 5A illustrates an arrangement configuration of the open/close sections in the liquid crystal barrier section 10, and FIG. 5B illustrates a sectional structure of the liquid crystal barrier section 10 of FIG. 5A in a V-V arrow direction. Note that in the example, it is assumed that the liquid crystal barrier section 10 performs normally black operation. In other words, it is assumed that the liquid crystal barrier section 10 allows light to be blocked in a non-driven state.

The liquid crystal barrier section 10 is a so-called parallax barrier, and includes the plurality of open/close sections (liquid crystal barrier) 11 and 12 which allows light to pass therethrough or to be blocked as illustrated in FIG. 5A. The open/close sections 11 and 12 perform different operations depending on whether the stereoscopic display device 1 performs normal display (two-dimensional display) or stereoscopic display. Specifically, as will be described later, the open/close sections 11 become an open state (transmissive state) when the stereoscopic display device 1 performs the normal display, and become a closed state (blocking state) when the stereoscopic display device 1 performs the stereoscopic display. The open/close sections 12, as will be described later, become an open state (transmissive state) when the stereoscopic display device 1 performs the normal display, and time-divisionally perform open/close operations when the stereoscopic display device 1 performs the stereoscopic display.

The open/close sections 11 and 12 are arranged to extend in one direction (in this case, in a direction rotated from the vertical direction Y by a predetermined angle θ) on the XY plane. In such a way, the open/close sections 11 and 12 are formed to extend in an oblique direction so that moire of the stereoscopic display device 1 is allowed to be suppressed. A width E1 of the open/close section 11 and a width E2 of the open/close section 12 are different from each other, and for example, the width E1 is larger than E2 in this case. Incidentally, the magnitude relationship between the widths of the open/close sections 11 and 12 is not limited thereto, and E1 may be equal to or smaller than E2. The open/close sections 11 and 12 include a liquid crystal layer (liquid crystal layer 19 described later), and the open/close state of the open/close sections 11 and 12 are switched in response to the drive voltage applied to the liquid crystal layer 19.

As illustrated in FIG. 5B, the liquid crystal barrier section 10 includes a transparent substrate 13 and a transparent substrate 16 which are made of glass, for example, and a liquid crystal layer 19 inserted between the transparent substrates 13 and 16. In this example, the transparent substrates 13 and 16 are disposed on a light incident side and on a light emission side, respectively. A transparent electrode layer 15 is formed on a surface on the liquid crystal layer 19 side of the transparent substrate 13, and a transparent electrode layer 17 is formed on a surface on the liquid crystal layer 19 side of the transparent substrate 16. The transparent electrode layers 15 and 17 are each formed of, for example, ITO. A polarizing plate 14 is bonded to the surface on the light incident side of the transparent substrate 13, and a polarizing plate 18 is bonded to a surface on the light emission side of the transparent substrate 16. A VA (vertical alignment) mode liquid crystal is used as the liquid crystal layer 19, for example.

The transparent electrode layer 15 includes a plurality of transparent electrodes 110 and 120. The transparent electrode layer 17 is provided as a common electrode for the transparent electrodes 110 and 120. In this example, a voltage of 0 V is applied to the transparent electrode layer 17. The transparent electrode 110 of the transparent electrode layer 15 and a portion corresponding to the transparent electrode 110 in the transparent electrode layer 17 configure the open/close section 11. Likewise, the transparent electrode 120 of the transparent electrode layer 15 and a portion corresponding to the transparent electrode 120 in the transparent electrode layer 17 configure the open/close section 12. In the liquid crystal barrier section 10 with such a structure, a voltage is selectively applied to the transparent electrodes 110 and 120, and liquid crystal molecules in the liquid crystal layer 19 are aligned according to the voltage, so that the open/close operation is performed for respective open/close sections 11 and 12. An alignment film (not illustrated) is formed on a surface on the liquid crystal layer 19 side of the transparent electrode layers 15 and 17.

The polarizing plates 14 and 18 control a polarization direction of each of light entering the liquid crystal layer 19 and light emitted from the liquid crystal layer 19. The transmission axis of the polarizing plate 14 is along a horizontal direction X, and the transmission axis of the polarizing plate 18 is along a vertical direction Y, for example. In other words, the transmission axes of the polarizing plate 14 and 18 are orthogonal to each other.

Figure 6:
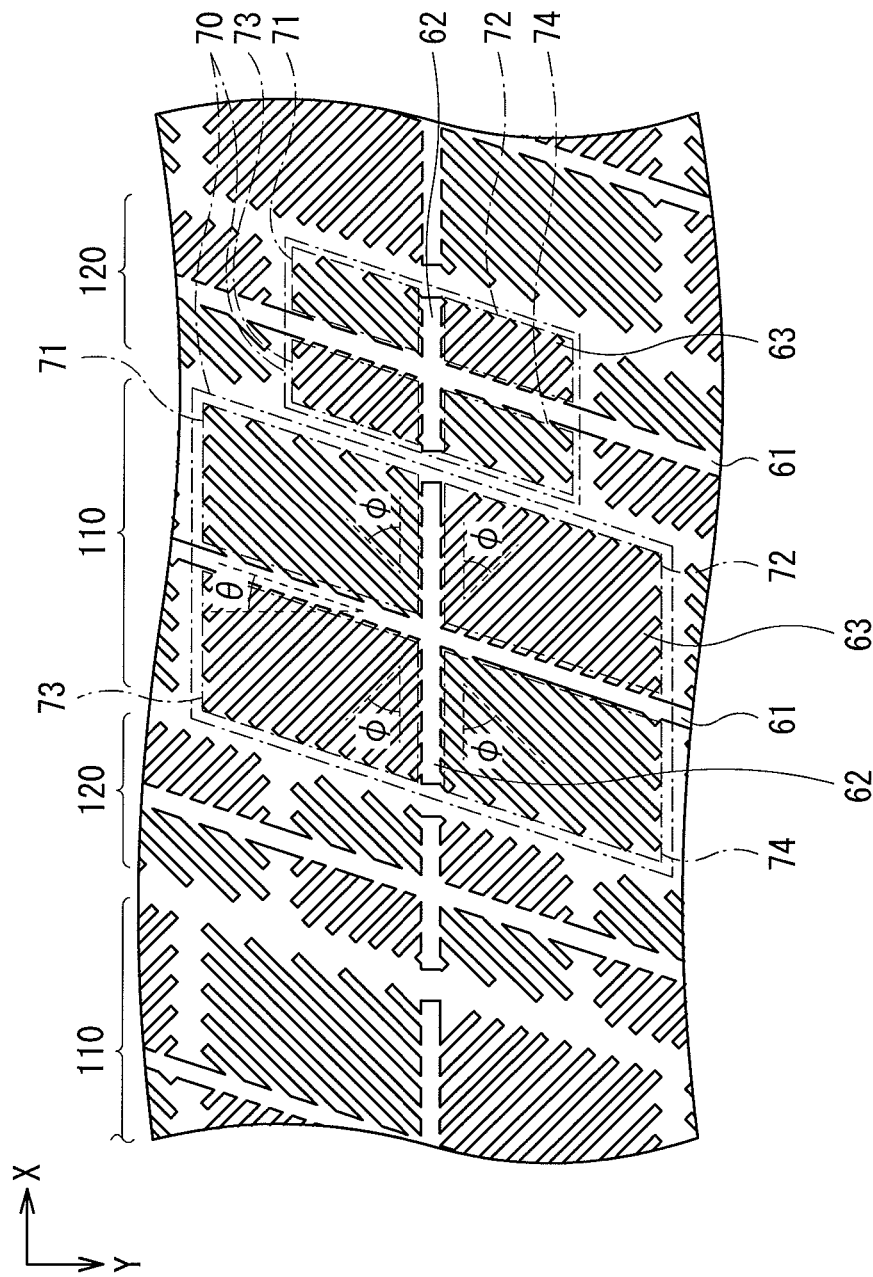
FIG. 6 is a plan view illustrating a configuration example of transparent electrodes in the liquid crystal barrier illustrated in FIG. 1.

FIG. 6 illustrates a configuration example of the transparent electrodes 110 and 120 in the transparent electrode layer 15. The transparent electrodes 110 and 120 each have a stem 61 extending in the same direction (in a direction rotated from the vertical direction Y by the predetermined angle θ) as the extending direction of the open/close sections 11 and 12. The angle θ may be set to, for example, 18 degrees. Sub-electrode regions 70 are arranged side by side along the extending direction of the stem 61 in each of the transparent electrodes 110 and 120. Each of the sub-electrode regions 70 includes a stem 62 and branches 63. The stem 62 is formed to extend in a direction intersecting the stem 61, and in this example, the stem 62 extends in the horizontal direction X. In each sub-electrode region 70, four branch regions (domains) 71 to 74 which are separated by the stems 61 and 62 are provided.

The branches 63 are formed to extend from the stems 61 and 62 in each of the branch regions 71 to 74. The line width of the branch 63 is the same in each of the branch regions 71 to 74, and the slit width is also the same in the branch regions 71 to 74. The branches 63 extend in the same direction in each of the branch regions 71 to 74. The extending direction of the branch 63 in the branch region 71 and the extending direction of the branch 63 in the branch region 73 are symmetrical about the vertical direction Y. Likewise, the extending direction of the branch 63 in the branch region 72 and the extending direction of the branch 63 in the branch region 74 are symmetrical about the vertical direction Y. In other words, the extending direction of the branch 63 in the branch region 71 and the extending direction of the branch 63 in the branch region 73 are asymmetrical about the stem 61. The extending direction of the branch 63 in the branch region 72 and the extending direction of the branch 63 in the branch region 74 are asymmetrical about the stem 61. Moreover, the extending direction of the branch 63 in the branch region 71 and the extending direction of the branch 63 in the branch region 72 are symmetrical about the stem 62 (the horizontal direction X). Likewise, the extending direction of the branch 63 in the branch region 73 and the extending direction of the branch 63 in the branch region 74 are symmetrical about the stem 62 (the horizontal direction X). In this example, specifically, the branches 63 in the branch regions 71 and 74 extend in a direction rotated counterclockwise from the horizontal direction X by a predetermined angle φ, and the branches 63 in the branch regions 72 and 73 extend in a direction rotated clockwise from the horizontal direction X by the predetermined angle φ. The angle φ is desirably 45 degrees, for example.

With such a configuration, when a voltage is applied to the transparent electrode layers 15 (the transparent electrodes 110 and 120) and 17 and then the potential difference therebetween is increased, the light transmittance in the liquid crystal layer 19 is increased and the open/close sections 11 and 12 are in the transmissive state (open state). On the other hand, as the potential difference is decreased, the light transmittance in the liquid crystal layer 19 is decreased and the open/close sections 11 and 12 are in the blocking state (closed state).

Incidentally, in this example, although it is assumed that the liquid crystal barrier section 10 performs normally black operation, the operation is not limited thereto. Alternatively, for example, the liquid crystal barrier section 10 may perform normally white operation. In this case, when the potential difference between the transparent electrode layers 15 and 17 is increased, the open/close sections are in the blocking state, and when the potential difference is decreased, the open close sections 11 and 12 are in the transmissive state. Note that the selection of the normally black operation or the normally white operation may be performed with use of the polarizing plate and liquid crystal molecular alignment, for example.

In the liquid crystal barrier section 10, the plurality of open/close sections 12 configure groups, and the plurality of open/close sections 12 included in one group performs the open operation or the close operation at the same timing when the stereoscopic display is performed. The groups of the open/close sections 12 will be described below.

Figure 7:
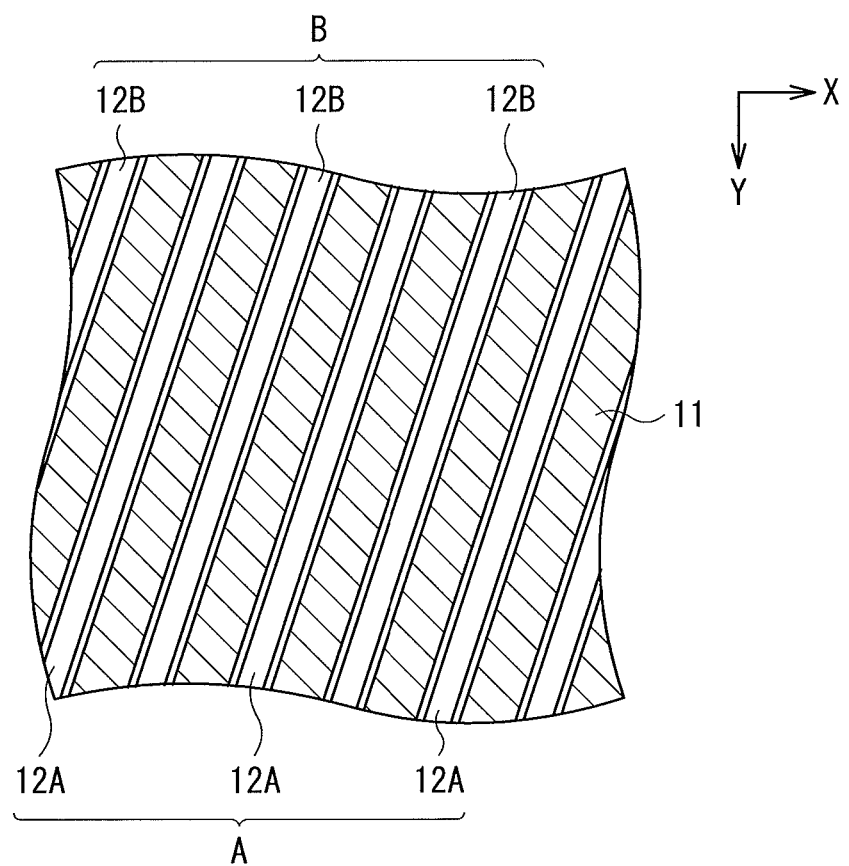
FIG. 7 is an explanatory diagram illustrating a configuration example of groups of the liquid crystal barrier illustrated in FIG. 1.

FIG. 7 illustrates a configuration example of the groups of the open/close sections 12. The open/close sections 12 configure two groups in this example. Specifically, the plurality of open/close sections 12 is alternately included in a group A and a group B. Incidentally, hereinafter, the open/close section 12A is appropriately used as a general term of the open/close section 12 included in the group A, and similarly, the open/close section 12B is appropriately used as a general term of the open/close section 12 included in the group B.

When the stereoscopic display is performed, the barrier drive section 41 drives the plurality of open/close sections 12 included in one group to perform open operation or close operation at the same timing. Specifically, as will be described later, the barrier drive section 41 drives the plurality of open/close section 12A included in the group A and the plurality of open/close section 12B included in the group B to perform open operation and close operation alternately in a time-divisional manner.

Figure 8A:
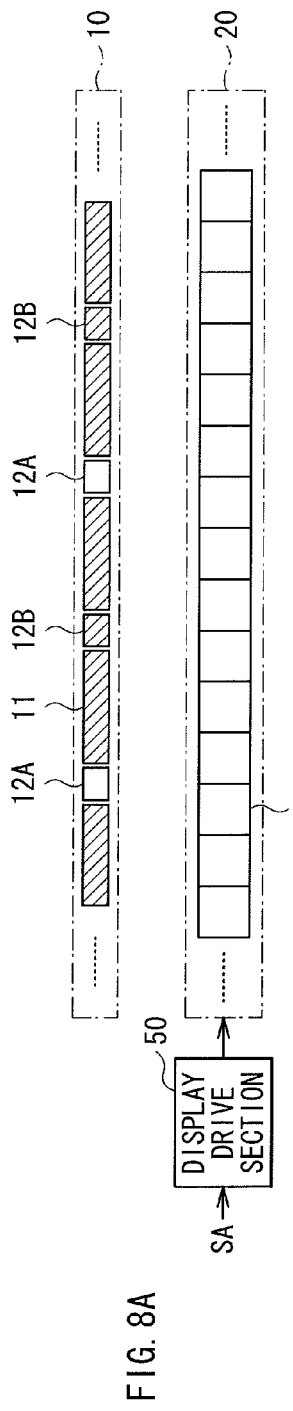
FIGS. 8A to 8C are schematic views illustrating operation examples of the display section and the liquid crystal barrier illustrated in FIG. 1.
Figure 8B:
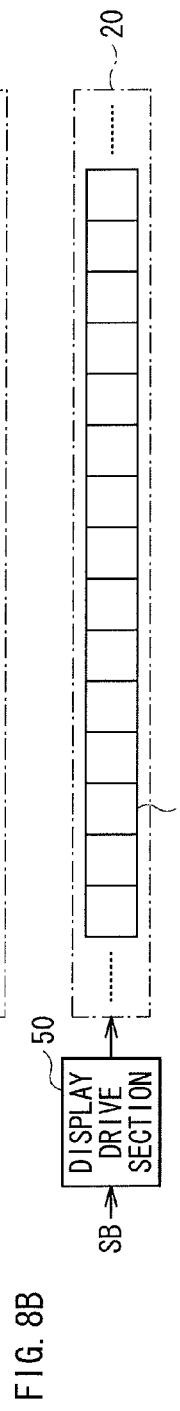
Figure 8C:
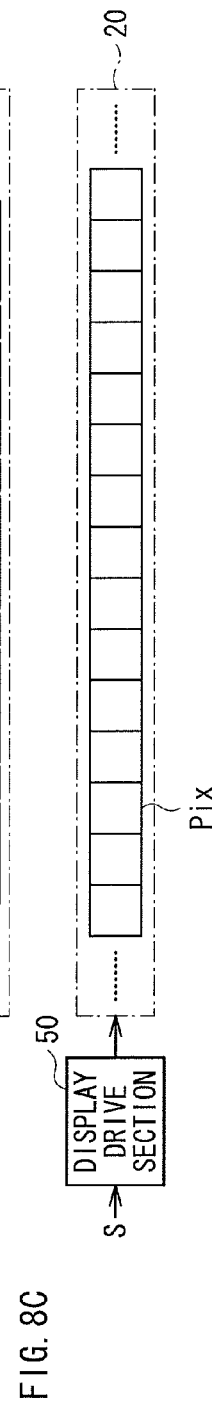

FIGS. 8A to 8C schematically illustrate, with use of a sectional structure, a state of the liquid crystal barrier section 10 when the stereoscopic display and the normal display (two-dimensional display) are performed, where FIG. 8A illustrates a state in performing the stereoscopic display, FIG. 8B illustrates another state in performing the stereoscopic display, and FIG. 8C illustrates a state in performing the normal display. In the liquid crystal barrier section 10, the open/close sections 11 and 12 (open/close sections 12A and 12B) are alternately arranged. In this example, the open/close sections 12A are arranged so that one open/close section 12A corresponds to six pixels Pix in the display section 20. Likewise, the open/close sections 12B are arranged so that one open/close section 12B corresponds to six pixels Pix in the display section 20. In the following description, a pixel Pix is a pixel configured of three sub-pixels (RGB), but the pixel Pix is not limited thereto. For example, the pixel Pix may be a sub-pixel. In the liquid crystal barrier section 10, portions in which light is blocked are illustrated by hatched lines.

When the stereoscopic display is performed, the image signals SA and SB are alternately supplied to the display drive section 50, and the display section 20 performs display based on the signals. Then, in the liquid crystal barrier section 10, the open/close sections 12 (open/close sections 12A and 12B) perform open operation and close operation time-divisionally, and the open/close sections 11 maintain the closed state (the blocking state). Specifically, when the image signal SA is supplied, as illustrated in FIG. 8A, the open/close sections 12A become the open state, and the open/close sections 12B become the closed state. In the display section 20, as will be described later, adjacent six pixels Pix which are arranged at positions corresponding to the open/close section 12A perform display corresponding to six perspective images included in the image signal SA. As a result, as will be described later, the viewer views different perspective images with his left eye and right eye for example, to perceive the displayed image as a stereoscopic image. Likewise, when the image signal SB is supplied, as illustrated in FIG. 8B, the open/close sections 12B become the open state, and the open/close sections 12A become the closed state. In the display section 20, as will be described later, adjacent six pixels Pix which are arranged at positions corresponding to the open/close section 12B perform display corresponding to six perspective images included in the image signal SB. As a result, as will be described later, the viewer views different perspective images with his left eye and right eye for example, to perceive the displayed image as a stereoscopic image. In this way, the stereoscopic display device 1 displays images by alternately opening the open/close sections 12A and the open/close sections 12B, thereby improving the resolution of the display device, as will be described later.

When the normal display (two-dimensional display) is performed, in the liquid crystal barrier section 10, as illustrated in FIG. 8C, the open/close sections 11 and the open/close sections 12 (open/close sections 12A and 12B) maintain the open state (the transmissive state). Therefore, the viewer is allowed to view a normal two-dimensional image as it is displayed on the display section 20 based on the image signal S.

In this case, the stereoscopic display device 1 corresponds to a specific example of "a display device" in the technology. The open/close sections 11 and 12 correspond to a specific example of "liquid crystal barriers" in the technology. The transparent electrodes 110 and 120 correspond to a specific example of "a first electrode" in the technology. The transparent electrode layer 17 corresponds to a specific example of "a second electrode" in the technology. The stem 61 corresponds to a specific example of "a first stem" in the technology. The stem 62 corresponds to a specific example of "a second stem" in the technology. The branch regions 71 to 74 correspond to specific examples of "first to fourth branch regions" in the disclosure, respectively. The open/close sections 12 (open/close sections 12A and 12B) correspond to a specific example of "first liquid crystal barriers" in the technology, and the open/close sections 11 correspond to a specific example of "second liquid crystal barriers" in the technology.

[Operation and Functions]

Subsequently, operation and functions of the stereoscopic display device 1 according to the embodiment will be described.

(General Operation Outline)

First, general operation outline of the stereoscopic display device 1 will be described referring to FIG. 1. The control section 40 supplies a control signal to each of the display drive section 50, the backlight drive section 42, and the barrier drive section 41, based on the image signal Sdisp supplied from the outside, and controls these sections to operate in synchronization with one another. The backlight drive section 42 drives the backlight 30 based on the backlight control signal CBL supplied from the control section 40. The backlight 30 emits surface-emitted light with respect to the display section 20. The display drive section 50 drives the display section 20 based on the image signal S supplied from the control section 40. The display section 20 performs display by modulating light emitted from the backlight 30. The barrier drive section 41 drives the liquid crystal barrier section 10 based on the barrier control signal CBR supplied from the control section 40. The open/close sections 11 and 12 (12A and 12B) of the liquid crystal barrier section 10 perform open operation and close operation based on the barrier control signal CBR to allow light which has been emitted from the backlight 30 and then passed through the display section 20 to pass therethrough or to be blocked.

(Detailed Operation of Stereoscopic Display)

Next, the detailed operation in the case where the stereoscopic display is performed will be described referring to some drawings.

FIGS. 9A and 9B illustrate operation examples of the display section 20 and the liquid crystal barrier section 10, where FIG. 9A illustrates a case where the image signal SA is supplied and FIG. 9B illustrates a case where the image signal SB is supplied.

When the image signal SA is supplied, the pixels Pix of the display section 20 each display one piece of pixel information P1 to P6 corresponding to six perspective images included in the image signal SA, as illustrated in FIG. 9A. At this time, the pixel information P1 to P6 are displayed on the pixels Pix arranged near the open/close section 12A, respectively. When the image signal SA is supplied, in the liquid crystal barrier section 10, the open/close sections 12A and the open/close sections 12B are controlled to become the open state (the transmissive state) and the closed state, respectively. The light from each of the pixels Pix of the display section 20 is output with an angle limited by the open/close section 12A. The viewer is allowed to view a stereoscopic image through viewing the pixel information P3 with his left eye and the pixel information P4 with his right eye, for example.

When the image signal SB is supplied, the pixels Pix of the display section 20 each display one piece of pixel information P1 to P6 corresponding to six perspective images included in the image signal SB, as illustrated in FIG. 9B. At this time, the pixel information P1 to P6 are displayed on the pixels Pix arranged near the open/close section 12B, respectively. When the image signal SB is supplied, in the liquid crystal barrier section 10, the open/close sections 12B and the open/close sections 12A are controlled to become the open state (the transmissive state) and the closed state, respectively. The light from each of the pixels Pix of the display section 20 is output with an angle limited by the open/close section 12B. The viewer is allowed to view a stereoscopic image through viewing the pixel information P3 with his left eye and the pixel information P4 with his right eye, for example.

In this way, the viewer views different pieces of pixel information between the pixel information P1 to P6 with his left eye and right eye, thereby being allowed to perceive the pixel information as a stereoscopic image. Moreover, the image is displayed by time-divisionally and alternately opening the open/close sections 12A and the open/close sections 12B, so that the viewer views, in an averaged manner, images displayed on positions displaced from each other. Accordingly, the stereoscopic display device 1 is allowed to achieve resolution twice as high as in the case where only the open/close sections 12A are provided. In other words, the resolution of the stereoscopic display device 1 is ⅓ (=⅙*2) of resolution in the case of two-dimensional display.

(Viewing Angle Characteristics)

First, alignment of the liquid crystal molecules in the liquid crystal layer 19 of the liquid crystal barrier section 10 is described.

Figure 10:
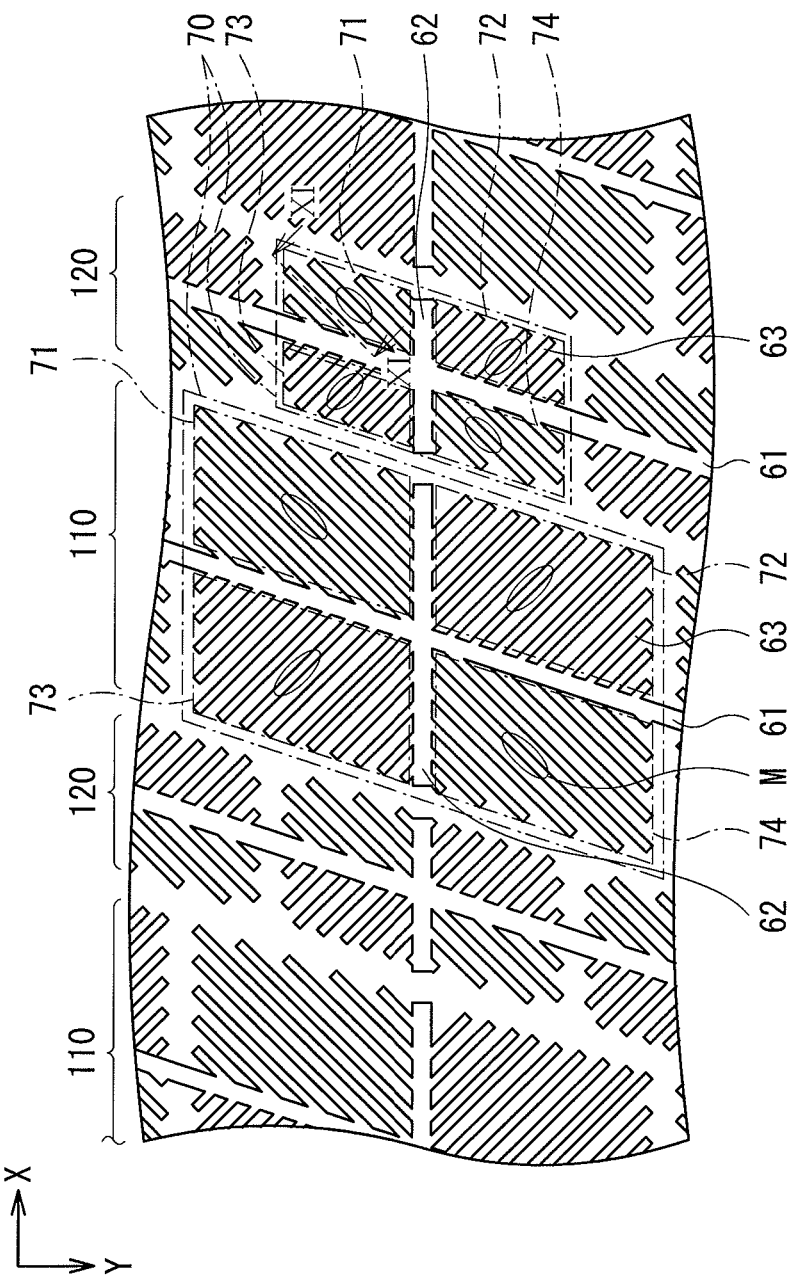
FIG. 10 is a schematic view illustrating an example of alignment directions of liquid crystal molecules in the liquid crystal barrier illustrated in FIG. 1.
Figure 11:
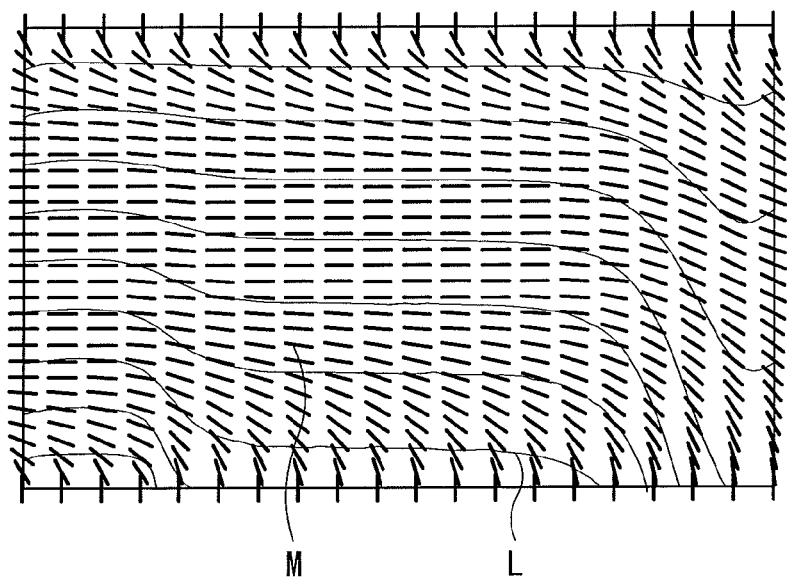
FIG. 11 is another schematic view illustrating an example of the alignment directions of the liquid crystal molecules in the liquid crystal barrier illustrated in FIG. 1.

FIG. 10 schematically illustrates an alignment direction of a liquid crystal molecule in each of the branch regions 71 to 74 when a voltage is applied. FIG. 11 illustrates alignment directions of liquid crystal molecules in a section surface of the transparent electrode 120 in FIG. 10 in a XI-XI arrow direction. Incidentally, in this case, for convenience of description, the transparent electrode 120 (the open/close sections 12) is described as an example, however, the same applies to the transparent electrode 110 (the open/close section 11).

When no voltage is applied between the transparent electrodes 120 (the transparent electrode layer 15) and the transparent electrode layer 17, a liquid crystal molecule M is aligned in a direction perpendicular to the transparent electrode layers 15 and 17. At this time, the open/close sections 12 of the liquid crystal barrier section 10 block light, and are in the closed state. On the other hand, when a voltage is applied between the transparent electrodes 120 (the transparent electrode layer 15) and the transparent electrode layer 17, the liquid crystal molecule M falls along an extending direction of the branch 63 in each of the branch regions 71 to 74 as illustrated in FIG. 10. Specifically, as illustrated in FIG. 11, the liquid crystal molecule M is aligned so that the longitudinal direction of the liquid crystal molecule M is parallel to an equipotential plane. At this time, the open/close sections 12 of the liquid crystal barrier section 10 allow light to pass therethrough, and are in the open state.

As described above, in the open state, the liquid crystal molecule M is aligned in a direction at the angle φ (for example, 45 degrees) from the horizontal direction X in each of the branch regions 71 to 74 as illustrated in FIG. 10. In other words, the direction in which the liquid crystal molecule M is aligned is a direction intermediate between the direction of the transmission axis of the polarizing plate 14 (the horizontal direction X in this example) and the direction of the transmission axis of the polarizing plate 18 (the vertical direction Y in this example). Accordingly, the viewing angle characteristics of the stereoscopic display device 1 are bilaterally symmetrical and diphycercal as will be described below.

Figure 12A:
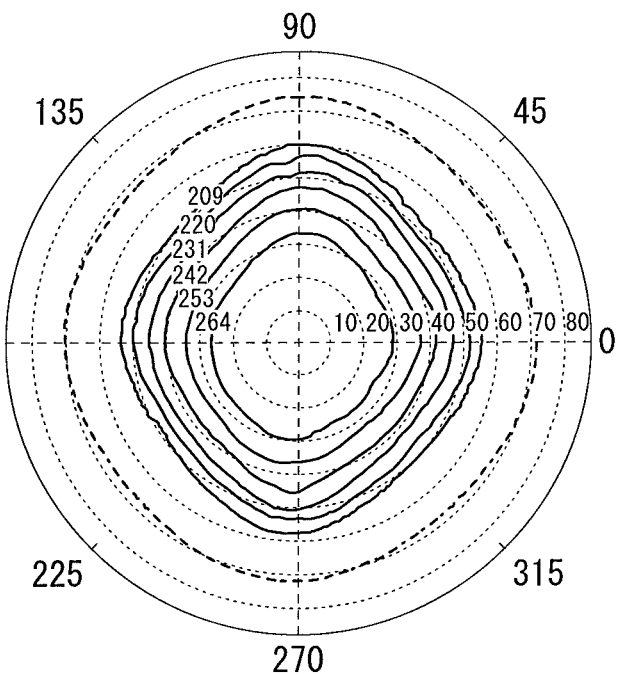
FIGS. 12A and 12B are characteristic diagrams illustrating examples of viewing angle characteristics of the stereoscopic display device illustrated in FIG. 1.
Figure 12B:
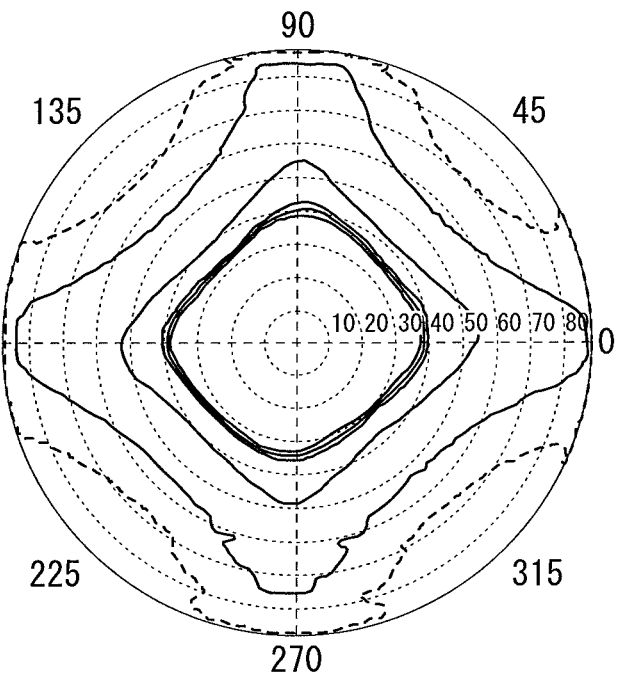

FIGS. 12A and 12B illustrate the viewing angle characteristics of the stereoscopic display device 1, where FIG. 12A illustrates the viewing angle characteristics in white display and FIG. 12B illustrates the viewing characteristics relating to contrast between white display and black display. In FIGS. 12A and 12B, the lateral direction corresponds to the horizontal direction of the display plane of the stereoscopic display device 1, and the longitudinal direction corresponds to the vertical direction of the display plane. FIG. 12A illustrates brightness in the white display with contour lines, and illustrates the fact that the brightness is increased toward a center. In FIG. 12A, a dashed line indicates a contour line corresponding to half the brightness of the peak. FIG. 12B illustrates the contrast with contour lines, and illustrates the fact that the contrast is increased toward the center. In FIG. 12B, a dashed line indicates a contour line where the contrast is 100.

As illustrated in FIGS. 12A and 12B, the contour lines are bilaterally symmetrical and diphycercal. This indicates that, in the stereoscopic display device 1, the brightness and the contrast of the display plan viewed from a predetermined angle in a rightward direction are substantially equal to the brightness and the contrast viewed from a predetermined angle in a leftward direction. Likewise, this indicates that the brightness and the contrast viewed from a predetermined angle in an upward direction are substantially equal to the brightness and the contrast viewed from a predetermined angle in the downward direction. In other words, the viewing angle characteristics of the stereoscopic display device 1 are bilaterally symmetrical and diphycercal.

As illustrated in FIG. 6, in the stereoscopic display device 1, the branch 61 of the transparent electrode 110 is formed to extend in the oblique direction corresponding to the open/close sections 11 and 12 (FIG. 5) formed to extend in the oblique direction. On the other hand, the branch 63 in each of the branch regions 71 to 74 is formed to extend in a direction at an angle $\phi$ (for example, 45 degrees) from the horizontal direction X. Accordingly, the liquid crystal molecule M is aligned in a direction of the angle $\phi$. The angle $\phi$ corresponds to an angle in a direction intermediate between the direction of the transmission axis of the polarizing plate 14 and the direction of the transmission axis of the polarizing plate 18, so that the viewing angle characteristics are allowed to be bilaterally symmetrical and diphycercal.

COMPARATIVE EXAMPLE

Next, a stereoscopic display device 1R according to a comparative example will be described. In the comparative example, the extending directions of the branches in each of the branch regions are different from those in the embodiment.

Figure 13:
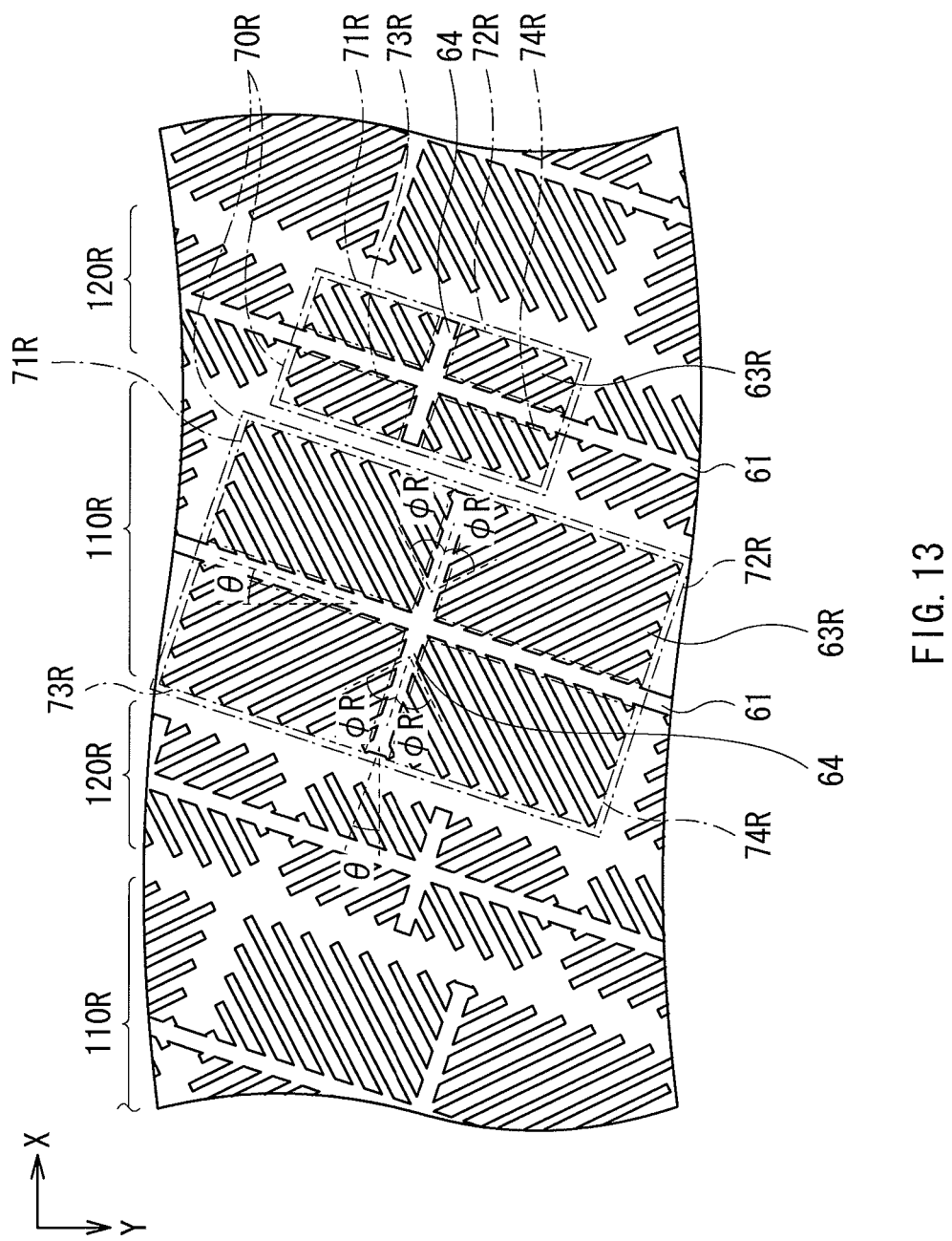
FIG. 13 is a plan view illustrating a configuration example of transparent electrodes according to a comparative example.

FIG. 13 illustrates a configuration example of transparent electrodes 110R and 120R of the stereoscopic display device 1R according to the comparative example. The transparent electrodes 110R and 120R each have sub-electrode regions 70R which are arranged side by side along the extending direction of the stem 61. Each sub-electrode region 70R includes a stem 64 and branches 63R. The stem 64 is formed to extend in a direction orthogonal to the stem 61. In each sub-electrode region 70R, four branch regions 71R to 74R which are separated by the stems 61 and 64 are provided.

The branches 63R are formed to extend from the stems 61 and 64. The extending direction of the branches 63R in the branch region 71R and the extending direction of the branches 63R in the branch region 73R are symmetrical about the stem 61. Likewise, the extending direction of the branches 63R in the branch region 72R and the extending direction of the branches 63R in the branch region 74R are symmetrical about the stem 61. In addition, the extending direction of the branches 63R in the branch region 71R and the extending direction of the branches 63R in the branch region 72R are symmetrical about the stem 64. Likewise, the extending direction of the branches 63R in the branch region 73R and the extending direction of the branches 63R in the branch region 74R are symmetrical about the stem 64. In this example, specifically, the branches 63R in each of the branch regions 71R and 74R extend in a direction rotated counterclockwise from the extending direction of the stem 64 by a predetermined angle $\phi R$. The branches 63R in each of the branch regions 72R and 73R extend in a direction rotated clockwise from the extending direction of the stem 64 by the predetermined angle $\phi R$. Herein, the angle $\phi R$ is 45 degrees, for example. The configuration is similar to the configuration in which the pixel electrode in the multi-domain type liquid crystal display device (for example, in Japanese Unexamined Patent Application Publication Nos. 2009-151204 and 2002-107730) is rotated by the angle $\theta$. Incidentally, in this example, the transmission axes of the polarizing plates 14 and 18 are similarly rotated based on the extending direction of the branches 63R in each of the branch regions 71R to 74R which is rotated compared with the case in the embodiment (FIG. 6).

Figure 14A:
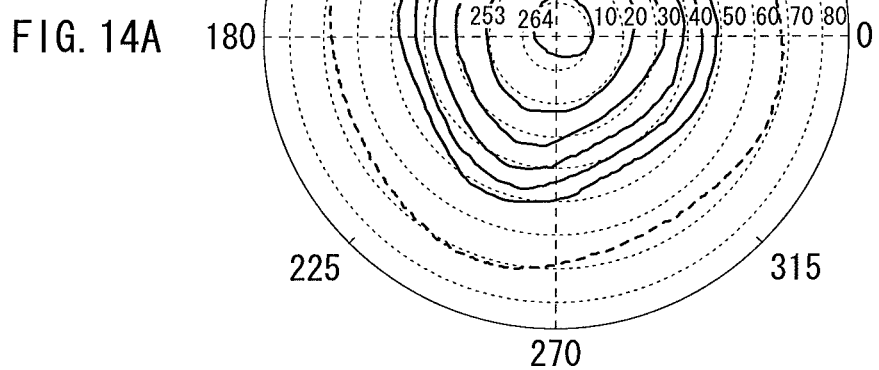
FIGS. 14A and 14B are characteristic diagrams illustrating examples of viewing angle characteristics of a stereoscopic display device according to the comparative example.
Figure 14B:
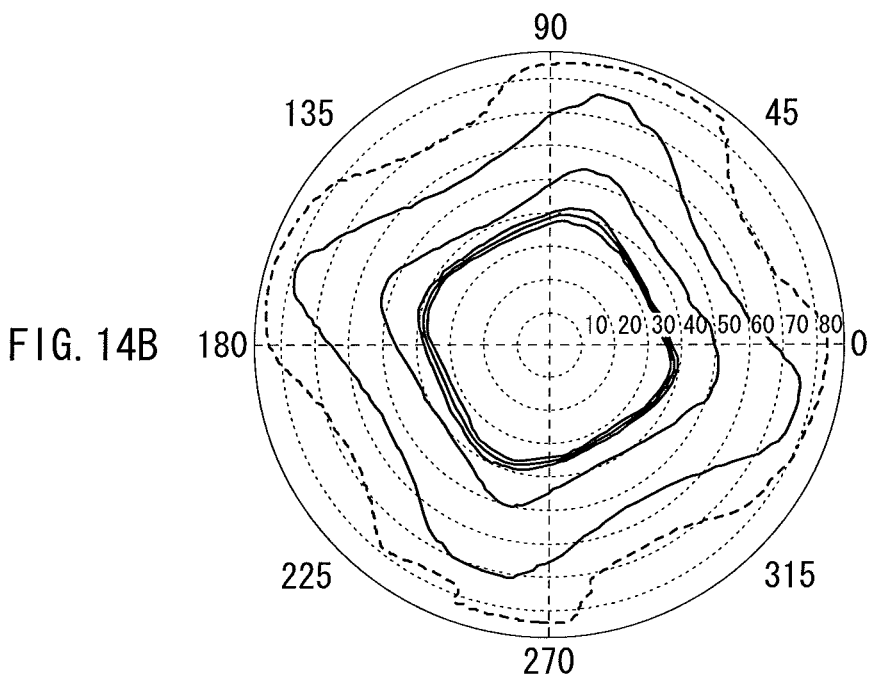

FIGS. 14A and 14B illustrate the viewing angle characteristics of the stereoscopic display device 1R according to the comparative example, where FIG. 14A illustrates the viewing angle characteristics in white display, and FIG. 14B illustrates the viewing angle characteristics relating to the contrast between white display and black display.

As illustrated in FIGS. 14A and 14B, in the stereoscopic display device 1R according to the comparative example, unlike the case in the stereoscopic display device 1 according to the above-described embodiment (FIG. 12), the contour lines are not bilaterally symmetrical or diphycercal, and are rotated clockwise by an angle corresponding to the gradient (angle $\theta$) of the stem 61 (open/close sections 11 and 12). Therefore, the viewing angle in the lateral direction and longitudinal direction is decreased compared with the case of the stereoscopic display device 1 according to the above-described embodiment (FIG. 12).

On the other hand, in the stereoscopic display device 1 according to the embodiment, as illustrated in FIGS. 12A and 12B, the contour lines are bilaterally symmetrical and diphycercal so that the wide viewing angle in the lateral direction and the longitudinal direction is allowed to be achieved.

[Effects]

As described above, in the embodiment, the stem 61 extending in a direction deviated from the vertical direction is provided, the extending direction of the branches in the branch region 71 and the extending direction of the branches in the branch region 73 are asymmetrical about the stem 61, and the extending direction of the branches in the branch region 72 and the extending direction of the branches in the branch region 74 are asymmetrical about the stem 61. Therefore, the viewing angle in the lateral direction is allowed to be set appropriately.

Moreover, in the embodiment, the extending direction of the branches in the branch region 71 and the extending direction of the branches in the branch region 73 are symmetrical about the vertical direction Y, and the extending direction of the branches in the branch region 72 and the extending direction of the branches in the branch region 74 are symmetrical about the vertical direction Y. Therefore, the viewing angle in the lateral direction is allowed to be symmetrical.

Moreover, in the embodiment, the stem 62 extending in the horizontal direction in the display plane is provided, the extending direction of the branches in the branch region 71 and the extending direction of the branches in the branch region 72 are symmetrical about the stem 62 (the horizontal direction X), and the extending direction of the branches in the branch region 73 and the extending direction of the branches in the branch region 74 are symmetrical about the stem 62 (the horizontal direction X). Therefore, the viewing angle in the longitudinal direction is allowed to be symmetrical.

Furthermore, in the embodiment, the extending direction of the branches in each of the branch regions 71 and 74 is set to a direction at 45 degrees counterclockwise from the horizontal direction, and the extending direction of the branches in each of the branch regions 72 and 73 is set to a direction at 45 degrees clockwise from the horizontal direction. Therefore, a wide viewing angle is allowed to be achieved.

Moreover, in the embodiment, the stem 61 is formed so as to extend in the same direction as the extending direction of the open/close sections 11 and 12. Therefore, compared with the case where the stem 61 is formed in a stepwise shape, a simple electrode structure is allowed to be achieved and the resistance value of the transparent electrode between an upper end and a lower end of the open/close sections 11 and 12 is allowed to be decreased.

[Modification 1-1]

In the above-described embodiment, the stem 62 is formed to extend in the horizontal direction X, however this is not limited thereto. Alternatively, for example, the stem 62 may be formed to extend in a direction orthogonal to the stem 61.

Figure 15:
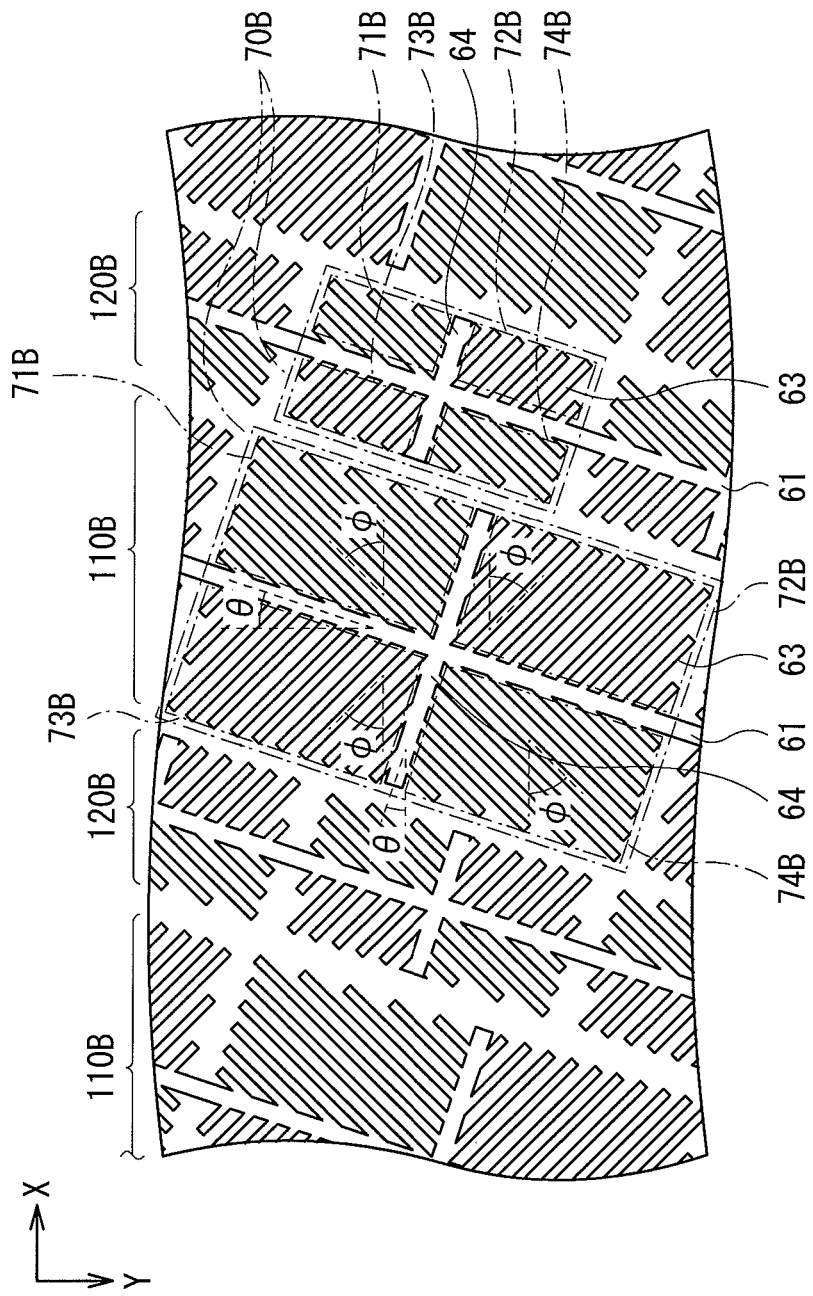
FIG. 15 is a plan view illustrating a configuration example of transparent electrodes according to a modification of the first embodiment.

FIG. 15 illustrates a configuration example of transparent electrodes 110B and 120B according to a modification. In each of the transparent electrodes 110B and 120B, sub-electrode regions 70B are arranged side by side along the extending direction of the stem 61. Each sub-electrode region 70B includes the stem 64 and the branches 63. The stem 64 is formed to extend in a direction orthogonal to the stem 61. Each sub-electrode region 70B includes four branch regions 71B to 74B which are separated by the stems 61 and 64.

Herein, the stem 64 corresponds to a specific example of "a second stem" in the disclosure.

The branches 63 are formed to extend from the stems 61 and 64 in each of the branch regions 71B to 74B. The extending direction of the branches 63 in the branch region 71B and the extending direction of the branches 63 in the branch region 72B are symmetrical about the horizontal direction X, and the extending direction of the branches 63 in the branch region 73B and the extending direction of the branches 63 in the branch region 74B are symmetrical about the horizontal direction X. In other words, the extending direction of the branches 63 in the branch region 71B and the extending direction of the branches 63 in the branch region 72B are asymmetrical about the stem 64, and the extending direction of the branches 63 in the branch region 73B and the extending direction of the branches 63 in the branch region 74B are asymmetrical about the stem 64.

Also in this case, the branches 63 in each of the branch regions 71B to 74B are formed to extend in a direction at the angle φ (for example, 45 degrees) from the horizontal direction X. Therefore, the liquid crystal molecule M is aligned in a direction of the angle φ and the viewing angle characteristics are allowed to be bilaterally symmetrical and diphycercal, so that a wide viewing angle is allowed to be achieved.

[Modification 1-2]

Figure 16:
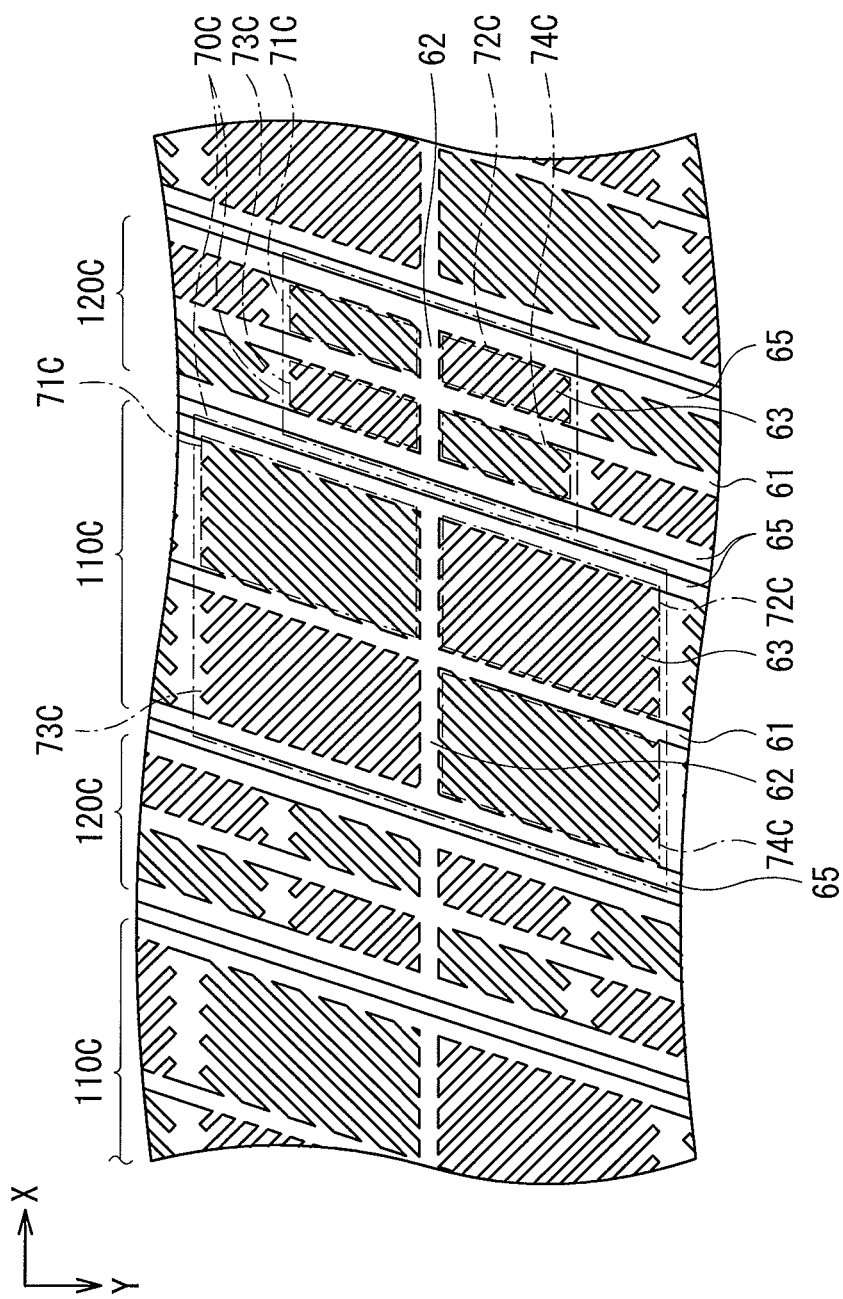
FIG. 16 is a plan view illustrating a configuration example of transparent electrodes according to another modification.
Figure 17:
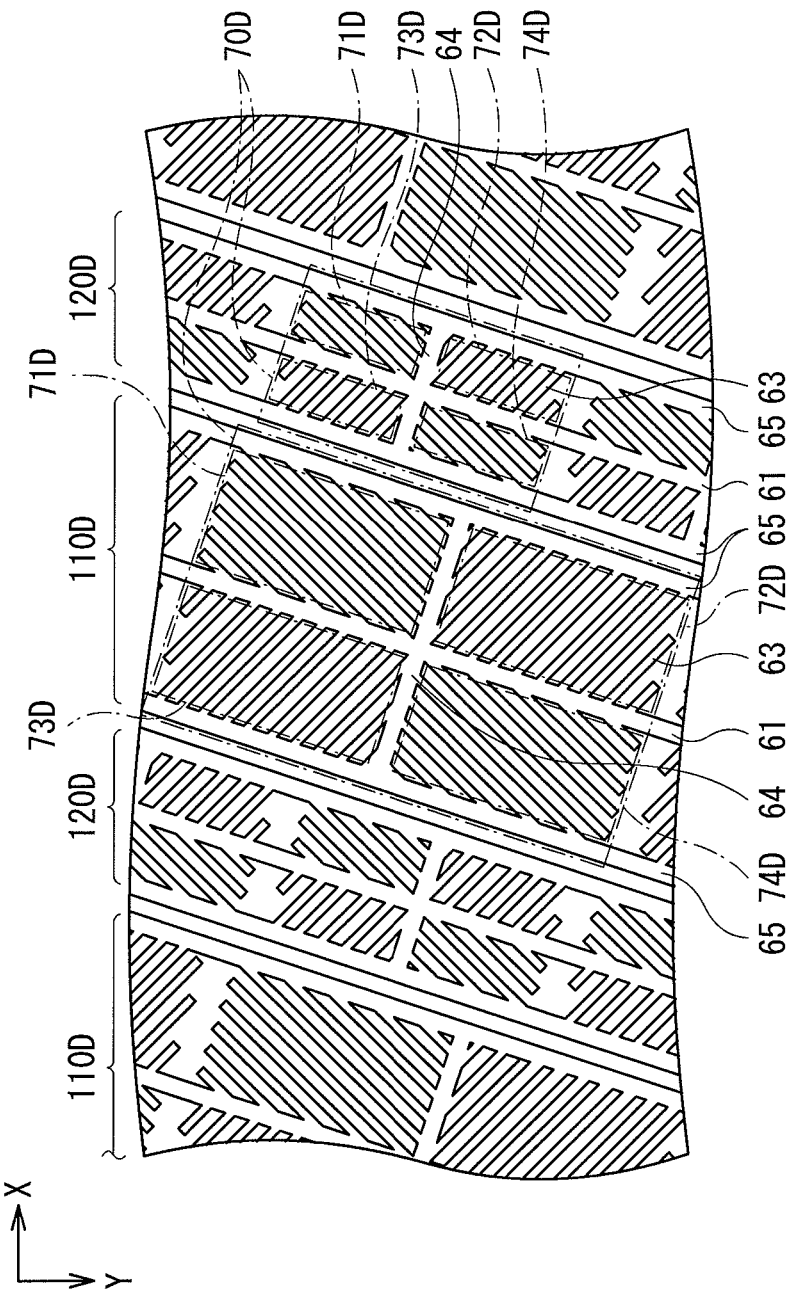
FIG. 17 is a plan view illustrating a configuration example of transparent electrodes according to still another modification.

In the above-described embodiment, the transparent electrodes 110 and 120 each have the stem 61 extending in the extending direction of the open/close sections 11 and 12, however this is not limited thereto. For example, as illustrated in FIGS. 16 and 17, the transparent electrodes 110 and 120 each may further include other electrodes extending in the same direction, in addition to the stem 61. FIG. 16 illustrates the transparent electrodes 110 and 120 (FIG. 6) in the above-described embodiment with fringes 65 at both sides thereof.

FIG. 17 illustrates the transparent electrodes 110B and 120B (FIG. 15) in the above-described modification with fringes 65 at both sides thereof. With such a configuration, the transparent electrode is decreased in the resistance value between the upper end and the lower end of the open/close sections 11 and 12.

[2. Second Embodiment]

Next, a stereoscopic display device 2 according to a second embodiment of the technology will be described. In the embodiment, a liquid crystal barrier is configured with use of a transparent electrode having two branch regions. The other configurations are similar to those in the above-described first embodiment (FIG. 1). Note that like numerals are used to designate substantially like components of the stereoscopic display device 1 according to the first embodiment, and the description thereof is appropriately omitted.

Figure 18:
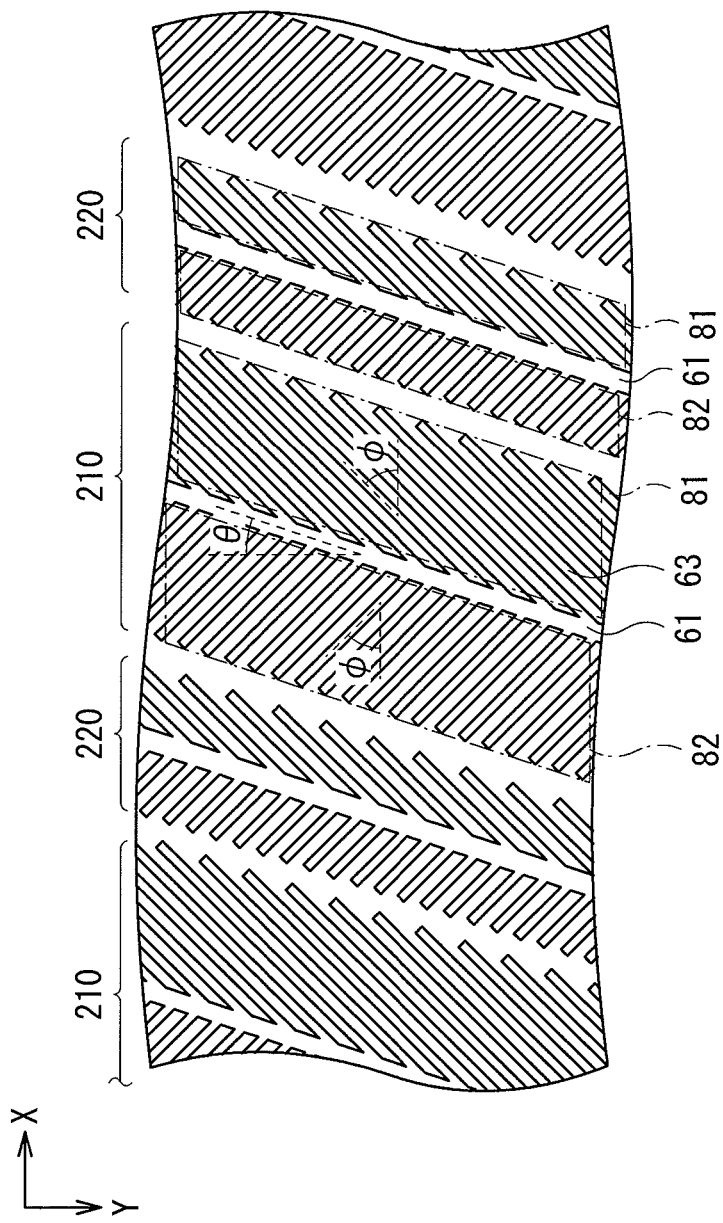
FIG. 18 is a plan view illustrating a configuration example of transparent electrodes according to a second embodiment.

FIG. 18 illustrates a configuration example of transparent electrodes 210 and 220 of the stereoscopic display device 2. The transparent electrodes 210 and 220 each have two branch regions 81 and 82 which are separated by the stem 61.

The branches 63 are formed to extend from the stem 61 in each of the branch regions 81 and 82. The branches 63 extend in the same direction in each of the branch regions 81 and 82, and extend in the different directions between the branch regions. The extending direction of the branches 63 in the branch region 81 and the extending direction of the branches 63 in the branch region 82 are symmetrical about the vertical direction Y. In other words, the extending direction of the branches 63 in the branch region 81 and the extending direction of the branches 63 in the branch region 82 are asymmetrical about the stem 61. Specifically, the branches 63 in the branch region 81 extend in a direction rotated counterclockwise from the horizontal direction X by a predetermined angle φ, and the branches 63 in the branch region 82 extend in a direction rotated clockwise from the horizontal direction X by the predetermined angle φ. The angle φ is desirably 45 degrees, for example. Note that the extending direction of the branches 63 in each of the branch regions 81 and 82 is not limited thereto. Alternatively, for example, the branches 63 in the branch region 81 may extend in a direction rotated clockwise from the horizontal direction X by the predetermined angle φ, and the branches 63 in the branch region 82 may extend in a direction rotated counterclockwise from the horizontal direction X by the predetermined angle φ.

As described above, in the embodiment, the stem 61 extending in a direction deviated from the vertical direction is provided, and the extending direction of the branches in the branch region 81 and the extending direction of the branches in the branch region 82 are asymmetrical about the stem 61. Therefore, the viewing angle in the lateral direction is allowed to be set appropriately.

Moreover, in the embodiment, the extending direction of the branches in the branch region 81 and the extending direction of the branches in the branch region 82 are symmetrical about the vertical direction Y. Therefore, the viewing angle in the lateral direction is allowed to be symmetrical.

Furthermore, in the embodiment, the extending direction of the branches in the branch region 81 is set to a direction at 45 degrees counterclockwise from the horizontal direction, and the extending direction of the branches in the branch region 82 is set to a direction at 45 degrees clockwise from the horizontal direction. Therefore, a wide viewing angle is allowed to be achieved.

The other effects are similar to those in the above-described first embodiment.

[Modification 2]

Figure 19:
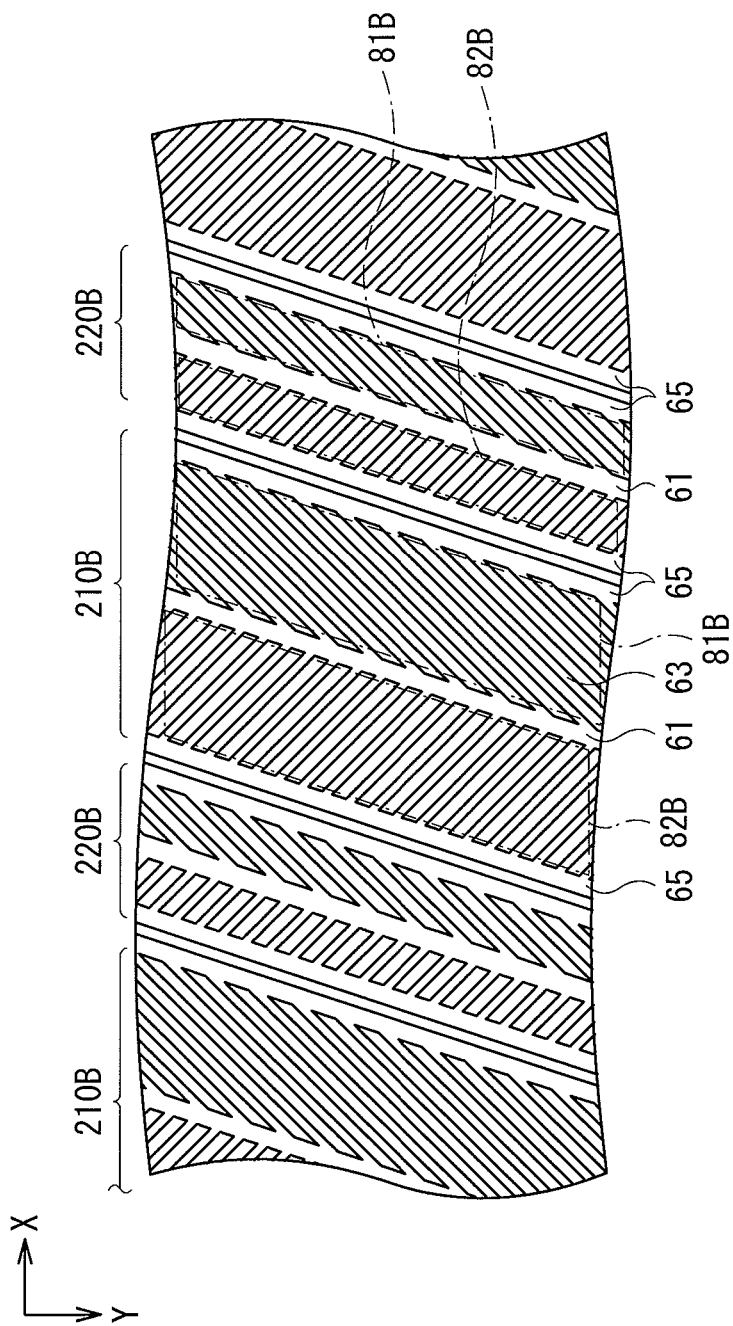
FIG. 19 is a plan view illustrating a configuration example of transparent electrodes according to a modification of the second embodiment.

In the above-described embodiment, the transparent electrodes 210 and 220 each have the stem 61 extending in the extending direction of the open/close sections 11 and 12, however, this is not limited thereto. Similarly to the modification of the above-described first embodiment, the transparent electrodes 210 and 220 each may further include other electrodes extending in the same direction, in addition to the stem 61. FIG. 19 illustrates the transparent electrodes 210 and 220 (FIG. 18) of the above-described second embodiment with fringes 65 at both sides thereof.

As described above, although the technology has been described with referring to the embodiments and the modifications, the technology is not limited to the embodiments and the like, and various modifications may be made.

Figure 20A:
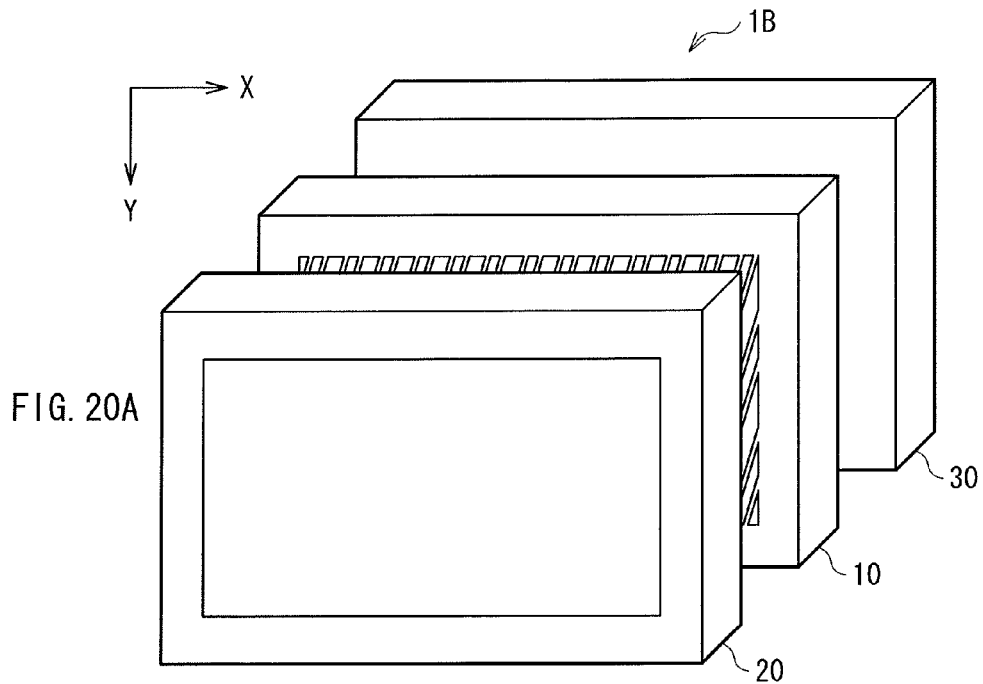
FIGS. 20A and 20B are explanatory diagrams illustrating a configuration example of a stereoscopic display device according to a modification.
Figure 20B:
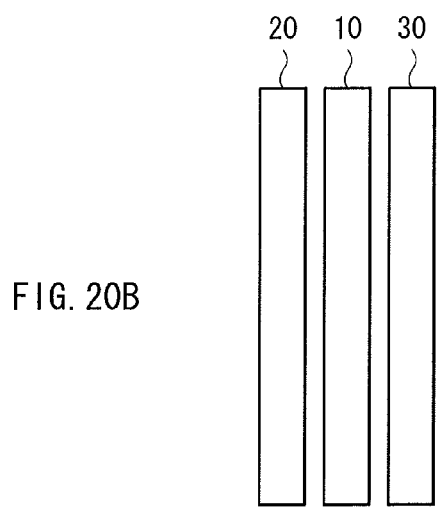

For example, in the above-described embodiments and the like, the backlight 30, the display section 20, and the liquid crystal barrier section 10 of the stereoscopic display device 1 are arranged in this order, however the arrangement order is not limited thereto. Alternatively, the arrangement may be made in order of the backlight 30, the liquid crystal barrier section 10, and the display section 20 as illustrated in FIGS. 20A and 20B.

FIGS. 21A and 21B illustrate operation examples of the display section 20 and the liquid crystal barrier section 10 according to the modification, where FIG. 21A illustrates a case where the image signal SA is supplied, and FIG. 21B illustrates a case where the image signal SB is supplied. In the modification, light emitted from the backlight 30 first enters the liquid crystal barrier section 10. Then, the display section 20 modulates light which has passed through the open/close sections 12A and 12B in the light, and then outputs six perspective images.

Moreover, for example, in the above-described embodiments and the like, the open/close sections 12 configure two groups, however the number of groups is not limited thereto. Alternatively, the open/close sections 12 may configure, for example, three or more groups. As a result, the resolution of the display is further improved. The detail will be described below.

Figure 22A:
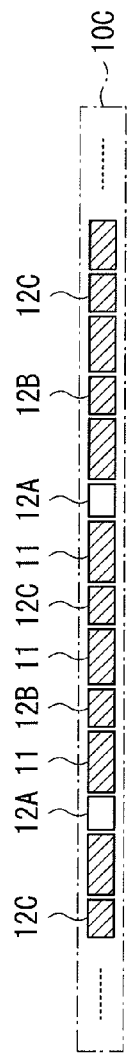
FIGS. 22A to 22C are schematic views illustrating operation examples of a display section and a liquid crystal barrier according to another modification.
Figure 22B:
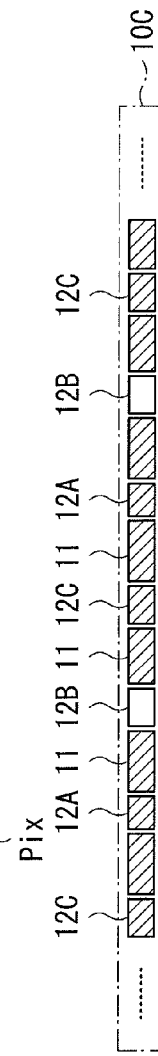
Figure 22C:
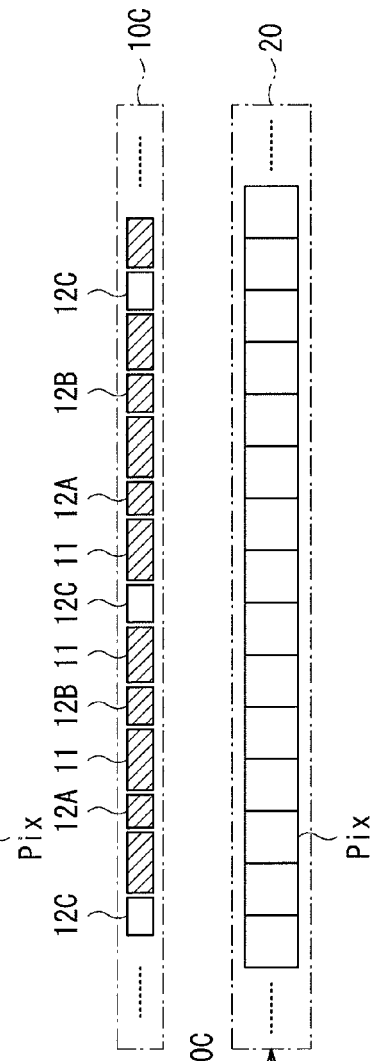

FIGS. 22A to 22C illustrate an example in the case where the open/close sections 12 configure three groups A, B, and C. As in the above-described embodiments, the open/close section 12A indicates the open/close section 12 included in the group A, the open/close section 12B indicates the open/close section 12 included in the group B, and an open/close section 12C indicates the open/close section 12 included in the group C.

In this way, the image is displayed by time-divisionally and alternately opening the open/close sections 12A, 12B, and 12C so that the stereoscopic display device according to the modification is allowed to achieve resolution three times as high as in the case where only the open/close section 12A is provided. In other words, the resolution of the stereoscopic display device is ½ (=⅙*3) of resolution in the case of two-dimensional display.

Moreover, for example, in the above-described embodiments and the like, the image signals SA and SB each include six perspective images, but the number of perspective images is not limited thereto. The image signals SA and SB may include five or less perspective images or seven or more perspective images. In this case, the relationship between the open/close sections 12A and 12B of the liquid crystal barrier section 10 and the pixels Pix illustrated in FIGS. 8A to 8C is also changed. In other words, for example, in the case where the image signals SA and SB each include five perspective images, the open/close sections 12A are desirably arranged so that one open/close section 12A corresponds to five pixels Pix of the display section 20, and likewise, the open/close sections 12B are desirably arranged so that one open/close section 12B corresponds to five pixels Pix of the display section 20.

Furthermore, for example, in the above-described embodiments and the like, the open/close sections 12 configure the plurality of groups, but are not limited thereto. Alternatively, all of the open/close sections 12 may be opened in performing the stereoscopic display without configuring groups.

In addition, for example, in the above-described embodiments and the like, the display section 20 is a liquid crystal display section, but is not limited thereto. Alternatively, the display section 20 may be an EL (Electro Luminescence) display section using an organic EL and the like. In this case, the backlight drive section 42 and the backlight 30 illustrated in FIG. 1 are allowed to be eliminated.

The present application contains subject matter related to that disclosed in Japanese Priority Patent Application JP 2011-025324 filed in the Japan Patent Office on Feb. 8, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
a display section displaying images; and
a liquid crystal barrier section having a plurality of liquid crystal barriers formed to extend in a first direction tilted from a vertical direction in a display plane of the display section, the plurality of liquid crystal barriers allowing light to pass therethrough or to be blocked, wherein
the liquid crystal barrier section includes
a liquid crystal layer, and
a first electrode and a second electrode which are disposed at positions corresponding to each of the liquid crystal barriers to sandwich the liquid crystal layer, and
the first electrode includes
a first stem extending in the first direction, and
a plurality of branches extending on both sides of the first stem, branches on one side of the first stem extending in a first extending direction, whereas branches on the other side of the first stem extending in a second extending direction, the first and second extending directions being line-asymmetrical about the first stem,
wherein the first and second extending directions are line-symmetrical about a line extending in the vertical direction;
wherein
a plurality of sub-electrode regions are provided along the first direction, and the plurality of branches are provided for each of the plurality of sub-electrode regions;
wherein
the first electrode includes, for each of the plurality of sub-electrode regions, a second stem extending in a second direction intersecting the first stem,
each of the plurality of sub-electrode regions is partitioned into first to fourth branch regions, the first and second branch regions being arranged on one side of the first stem to sandwich the second stem, the third branch region being arranged on an opposite side of the first stem from the first branch region, the fourth branch region being arranged on an opposite side of the first stem from the second branch region, and branches included in each of first to fourth branch regions extend in the same direction within respective branch regions;

wherein the branches in each of the first to fourth branch regions extend in a direction away from both the first stem and the second stem;

wherein an extending direction of the branches in the first branch region is the same as an extending direction of the branches in the fourth branch region, and an extending direction of the branches in the second branch region is the same as an extending direction of the branches in the third branch region;

wherein the second direction corresponds to the horizontal direction in the display plane of the display section, and in each of the sub-electrode regions, the extending direction of the branches in the first branch region and the extending direction of the branches in the second branch region are line-symmetrical about the second stem, and the extending direction of the branches in the third branch region and the extending direction of the branches in the fourth branch region are line-symmetrical about the second stem, each of a plurality of sub-electrode regions partitioned into first to fourth branch regions.

2. The display device according to claim 1, wherein the second direction corresponds to a direction tilted from the horizontal direction in the display plane of the display section, and in each of the sub-electrode regions, the extending direction of the branches in the first branch region and the extending direction of the branches in the second branch region are line-asymmetrical about the second stem, and the extending direction of the branches in the third branch region and the extending direction of the branches in the fourth branch region are line-asymmetrical about the second stem.

3. The display device according to claim 1, wherein the plurality of branches are partitioned into branches in a first branch region and branches in a second branch region, the first and second branch regions being located on both sides of the first stem, branches included in each of first and branch regions extend in the same direction within respective branch regions, and branches in the first branch region extend in a direction different from a extending direction of branches in the second branch region.

4. The display device according to claim 3, further comprising:

a first polarizing plate provided on an opposite side of the first electrode from the liquid crystal layer, and allowing light polarized in one direction of the vertical direction and a horizontal direction in the display plane of the display section, to pass therethrough; and a second polarizing plate provided on an opposite side of the second electrode from the liquid crystal layer and allowing light polarized in the other direction of the vertical direction and the horizontal direction, to pass therethrough, wherein the branches in the first branch region extend in a direction tilted counterclockwise from the horizontal direction by 45 degrees, and the branches in the second branch region extend in a direction tilted clockwise from the horizontal direction by 45 degrees.

5. The display device according to claim 1, further comprising a plurality of display modes including a three-dimensional display mode and a two-dimensional display mode, wherein the plurality of liquid crystal barriers includes a plurality of first liquid crystal barriers and a plurality of second liquid crystal barriers, the three-dimensional display mode allows the display section to display a plurality of different perspective images, allows the plurality of first liquid crystal barriers to stay in a transmissive state as well as the plurality of second liquid crystal barriers to stay in a blocking state, and thus allows a three-dimensional image to be displayed, and the two-dimensional display mode allows the display section to display one perspective image, allows the plurality of first liquid crystal barriers and the plurality of second liquid crystal barriers to stay in the transmissive state, and thus allows a two-dimensional image to be displayed.

6. The display device according to claim 5, wherein the plurality of first liquid crystal barriers is grouped into a plurality of barrier groups, and the three-dimensional display mode allows liquid crystal barriers in each of the plurality of barrier group to be time-divisionally switched between the transmissive state and the blocking state.

7. The display device according to claim 1, further comprising a backlight, wherein the display section is a liquid crystal display section which is disposed between the backlight and the liquid crystal barrier section.

* * * * *